(12) United States Patent
Hikosaka et al.

(10) Patent No.: US 9,605,116 B2
(45) Date of Patent: Mar. 28, 2017

(54) METHOD FOR SECONDARY MOLDING OF POLYMER NANO ORIENTED CRYSTAL MATERIAL

(75) Inventors: Masamichi Hikosaka, Hiroshima (JP); Kiyoka Okada, Hiroshima (JP); Junichiro Washiyama, Kanagawa (JP); Takeshi Nakajima, Kanagawa (JP); Yuka Akiyama, Kanagawa (JP); Shingo Ueno, Hiroshima (JP)

(73) Assignees: SUNALLOMER LTD., Tokyo (JE); HIROSHIMA UNIVERSITY, Hiroshima (JP)

( * ) Notice: Subject to any disclaimer, the term of this patent is extended or adjusted under 35 U.S.C. 154(b) by 688 days.

(21) Appl. No.: 13/877,787

(22) PCT Filed: Oct. 7, 2011

(86) PCT No.: PCT/JP2011/073268
§ 371 (c)(1),
(2), (4) Date: Apr. 4, 2013

(87) PCT Pub. No.: WO2012/046858
PCT Pub. Date: Apr. 12, 2012

(65) Prior Publication Data
US 2013/0196168 A1    Aug. 1, 2013

(30) Foreign Application Priority Data

Oct. 8, 2010 (JP) .................................. 2010-228752
Jun. 21, 2011 (JP) .................................. 2011-137828

(51) Int. Cl.
B29C 43/52      (2006.01)
B29C 67/24      (2006.01)
(Continued)

(52) U.S. Cl.
CPC ............... *C08J 5/00* (2013.01); *B29C 43/222* (2013.01); *B32B 27/08* (2013.01); *C08F 10/02* (2013.01);
(Continued)

(58) Field of Classification Search
None
See application file for complete search history.

(56) References Cited

U.S. PATENT DOCUMENTS 7,871,548 B2    1/2011  Hikosaka et al.
2006/0142521 A1  6/2006  Rastogi et al.
(Continued)

FOREIGN PATENT DOCUMENTS

JP    2000-301598     10/2000
JP    2007-521342 A   8/2007
(Continued)

OTHER PUBLICATIONS

Office action dated Sep. 9, 2015 issued in related Chinese Patent Application No. 201180048305.4 (Translated).*
(Continued)

*Primary Examiner* — Monique Jackson
(74) *Attorney, Agent, or Firm* — Harness, Dickey and Pierce, P.L.C.

(57) ABSTRACT

A method for secondary-molding a polymer nano oriented crystal material in accordance with an embodiment of the present invention includes the steps of: heating the polymer nano oriented crystal material so that the polymer nano oriented crystal material changes into a mobile phase or a melt having a dense entanglement network structure; molding the polymer nano oriented crystal material which changed into the mobile phase or the melt including the dense entanglement network in the step; and cooling the polymer nano oriented crystal material, which has under-
(Continued)

gone the step, until the polymer nano oriented crystal material changes into an ordered phase.

7 Claims, 23 Drawing Sheets

(51) Int. Cl.
| | | |
|---|---|---|
| C08J 5/00 | (2006.01) | |
| B29C 43/22 | (2006.01) | |
| B32B 27/08 | (2006.01) | |
| C08F 10/02 | (2006.01) | |
| C08F 10/06 | (2006.01) | |
| B29C 43/00 | (2006.01) | |
| B29C 43/24 | (2006.01) | |
| B29C 43/46 | (2006.01) | |

(52) U.S. Cl.
CPC ............ *C08F 10/06* (2013.01); *B29C 43/003* (2013.01); *B29C 43/24* (2013.01); *B29C 43/46* (2013.01); *B29C 43/52* (2013.01); *Y10T 428/31913* (2015.04)

(56) References Cited

U.S. PATENT DOCUMENTS

| | | |
|---|---|---|
| 2009/0249883 A1 | 10/2009 | Hikosaka et al. |
| 2010/0063235 A1 | 3/2010 | Hikosaka et al. |
| 2010/0087929 A1 | 4/2010 | Rastogi et al. |
| 2011/0014408 A1 | 1/2011 | Fujiwara et al. |
| 2011/0300364 A1 | 12/2011 | Hikosaka et al. |
| 2012/0018917 A1 | 1/2012 | Washiyama et al. |
| 2012/0028006 A1* | 2/2012 | Yamaguchi ............ C08K 5/098 428/212 |

FOREIGN PATENT DOCUMENTS

| | | | |
|---|---|---|---|
| JP | 2008-248039 | 10/2008 | |
| JP | WO 2010035912 A2 * | 4/2010 | ........... C08K 5/0083 |
| JP | 2010-168485 A | 8/2010 | |
| WO | WO 2007/026832 | 3/2007 | |
| WO | WO 2008/108251 | 9/2008 | |
| WO | WO 2009/008340 | 1/2009 | |
| WO | WO 2010/084750 | 7/2010 | |

OTHER PUBLICATIONS

Office Action dated Dec. 9, 2014 issued in Japanese Patent Application No. 2011-137828—with English translation.
Shen, X. (2009) "Principle of Polymer Material Processing", *China Textile & Apparel Press*, 334-337 & 347-355 with full English translation.
Varga, J. (1992) "Review Supermolecular structure of isotactic polypropylene", *Journal of Materials Science*, 27(10): 2557-2579.
Chinese Office Action with full English translation dated Sep. 3, 2014 issued in Chinese Patent Application No. 201180048305.4.
Notice of Allowance dated May 26, 2015 issued in Japanese Patent Application No. 2011-137828 with full English translation.
Zhu, X. (2004), "Study on Crystalization and Melting Behaviors of Isotactic Polypropylene", *CDDBFT*, pp. I-II, pp. 11-14, 50-82 and 111-125—with Full English translation.
Office Action dated Feb. 10, 2015 issued in Chinese Patent Application No. 201180048305.4—with Full English translation.
International Search Report dated Dec. 13, 2011.
Keller, A. et al., "Oriented Crystallization in Polymers," J. Macromol. Sci., Phys., B1(1), pp. 41-91, 1967.
Yamazaki, S. et al., "Formation mechanism of shish in the oriented melt (I)-bundle nucleus becomes to shish," Polymer, 46, pp. 1675-1684, 2005.
Yamazaki, S. et al., "Formation mechanism of shish in the oriented melt (II)-two different growth mechanisms along and perpendicular to the flow direction," Polymer, 46, pp. 1685-1692, 2005.
Watanabe, K. et al., "Acceleration Mechanism of Growth Rates under Shear Flow Due to the Oriented Melt—The Novel Morphology of Spiral Crystal (Spiralite)-," Macromolecules 39(4), pp. 1515-1524, 2006.
Wunderlich, B. et al., "Polyethylene Crystallized from the Melt under Elevated Pressure," Journal of Polymer Science, Part A, vol. 2, pp. 3697-3706, 1964.
Fujiyama, M. et al., "Structure of skin layer of injection-molded polypropylene," Kobunshi Ronbunshu, vol. 32, No. 7, pp. 411-417, Jul. 1975. (Full English translation provided).
Hikosaka, M., "Unified theory of nucleation of folded-chain crystals and extended-chain crystals of linear-chain polymers," Polymer, vol. 28, pp. 1257-1264, 1987.
Gu. F., et al., "Second-order phase transition of high isotactic polypropylene at high temperature," Polymer, pp. 1473-1481, 2002.
Hikosaka, M. et al., "The Order of the Molecular Chains in Isotactic Polypropylene Crystals," Polymer Journal, vol. 5, No. 2, pp. 111-127, 1973.

\* cited by examiner

50 μm

10mm

10mm

METHOD FOR SECONDARY MOLDING OF POLYMER NANO ORIENTED CRYSTAL MATERIAL

TECHNICAL FIELD

The present invention relates to a method for secondary-molding (molding, fusing, joining etc.) a polymer nano oriented crystal material.

BACKGROUND ART

So-called "general-purpose plastics" such as polyethylene (hereinafter, referred to as "PE"), polypropylene (hereinafter, referred to as "PP"), polystyrene (hereinafter, referred to as "PS"), and polyvinyl chloride (hereinafter, referred to as "PVC"), are commonly used as materials for various daily-use products (such as bags, various wrappings, various containers, and sheets) and materials for industrial parts of automobiles and electrical products, daily necessities, miscellaneous goods, and the like, not only because they are available at very low prices, but also because they are easy to mold and are lighter in weight than metal and ceramics (are a fraction of the weight of metal or ceramics).

However, the general-purpose plastics have drawbacks such as that the general-purpose plastics are insufficient in mechanical strength and that they have low heat tolerance. Accordingly, the general-purpose plastics currently are limited in its applicable range, since the general-purpose plastics do not fulfill the sufficient properties required as materials used for various industrial products, e.g. mechanical products such as automobiles, and electrical, electronic, and information products. For example, PE typically softens at a temperature of approximately 90° C. Further, PP, which is considered to have a relatively high heat tolerance, typically softens at approximately 130° C. Moreover, since PP is insufficient in transparency in comparison with polycarbonate (hereinafter, referred to as "PC"), polyethylene terephthalate (hereinafter, referred to as "PET") and PS, PP suffers from such a drawback that it cannot be used as optical materials, bottles, or transparent containers.

On the other hand, so-called "engineering plastics" such as PET, PC, fluoroplastics (e.g. Teflon (registered trademark)), nylon, polymethylpentene, polyoxymethylene, and acrylic resin, have excellent mechanical strength, heat tolerance, transparency, and like properties, and typically do not soften at 150° C. Therefore, the engineering plastics are used as various materials for industrial products such as automobiles, mechanical products and electric products which require high performance, and optical materials. However, the engineering plastics suffer from serious drawbacks: For example, the engineering plastics are expensive, and the engineering plastics are very environmentally unfriendly because it is difficult or impossible to convert them back into monomers for recycling.

Therefore, if the material properties such as mechanical strength, heat tolerance, and transparency of the general-purpose plastics are so remarkably improved that the general-purpose plastics can replace the engineering plastics and even metal materials, it becomes possible to greatly reduce costs of various industrial products and daily-use products made of polymers and metals, greatly save energy through a reduction in weight, and improve its operability. For example, if PP can be used instead of PET which is currently used as bottles for beverages such as soft drinks, this allows for greatly reducing the costs of bottles. Although it is possible to recycle PET into monomers, it is not easy to carry this out. Hence, used PET bottles are cut, are reused once or twice in low-quality applications such as using as clothing fibers and films, and thereafter are discarded. Meanwhile, PP can be easily recycled into monomers; this allows a complete recycling of PP, thus bringing about a merit that it is possible to reduce the consumption of fossil fuels such as oil and reduce generation of carbon dioxide ($CO_2$).

As mentioned above, in order to improve the properties such as the mechanical strength, heat tolerance, and transparency of the general-purpose plastics to use the general-purpose plastics as a replacement of the engineering plastics and metals, a remarkable increase is necessary in the proportion of crystals (crystallinity) in PP or PE, or more preferably, a crystal substance which is purely crystalline and which hardly contains an amorphous PP or PE is necessarily prepared. Particularly, high expectations are placed on PP, since PP is advantageous in that it has a stronger mechanical strength and a higher heat tolerance as compared to PE. Further, PP is an important polymer which maintains a high yearly production increase rate of several percent.

One method known to improve crystal properties of a polymer is to cool a melt of the polymer at a slow rate. This method, however, is totally insufficient in the increase of crystallinity. Further, this method causes a significant deterioration in productivity of products, and further causes an increase in crystal grain size to a bulky size, thus causing a decrease in mechanical strength. Another method proposed to increase the crystallinity is to cool the melt of the polymer under high pressure. This method, however, requires applying a pressure of several hundred atm or greater to the melt of the polymer. Although this method is possible theoretically, it is not feasible in industrial production due to the complicated design required of the production apparatus and due to its high production cost. Thus, this method is difficult to accomplish practically. Another method known to improve the crystal properties of the polymer is to add a nucleating agent to the polymer melt. However, this method currently suffers from the following drawbacks: (a) inevitable contamination of the polymer melt due to the nucleating agent as impurities, (b) an insufficient increase in crystallinity, and (c) an increase in cost due to the nucleating agent being much higher in cost than that of the resin. In conclusion, there is currently no complete method to dramatically improve the crystallinity of a polymer such as the general-purpose plastics, and to produce a crystal substance of the polymer.

Incidentally, many studies have shown that the polymer melt (also called isotropic melt) in which molecular chains take random conformation (e.g. "random coil") is crystallized under shear flow to sparsely generate a combination of shish crystal form and kebab crystal form in the polymer melt (see Non Patent Literature 1). The shish crystal form is a fiber-like crystal of several μm in diameter and is oriented along the flow. The kebab crystal form is a lamination of thin-film crystal and amorphous of 10 nm in thickness skewered on the shish crystal form. This form is referred to as "shish-kebab", meaning "skewer" and "meat" of skewered grilled-chicken (Japanese "Yakitori").

In the production of the shish-kebab form, only the shish form is created locally in an initial period. The shish form is of an Extended Chain Crystal (ECC) structure in which straightly-elongated molecular chains are crystallized (see Non Patent Literature 5). On the other hand, the crystal portion of the kebab form is of a Folded Chain Crystal (FCC) structure in which the molecular chains are folded at a surface of the thin-film crystal. How the shish-kebab form is produced has not been explained in terms of molecular theory, since no studies have been carried out kinetically, and thus was unknown. The FCC is a thin-film crystal (called a lamellar crystal) which is most widely seen among polymers of crystals. Moreover, it is commonly known that injection molding forms a "skin" (which is a thin crystalline film of several hundred μm thickness) on surface, and a "core" inside. The core is an aggregate of "laminated structures (laminated lamellar structures)" in which the folded chain crystal and amorphous are laminated (see Non Patent Literature 6). It is considered that the skin is formed from the shish-kebab form, but the shish has been observed as being formed only sparsely. No studies have been performed based on kinetic study on the production mechanism of the skin structure, and hence the production mechanism remains totally unknown.

The inventors of the present invention are pioneers to study the production mechanism of the shish form kinetically, and found the mechanism of the local formation of the shish form in the melt: at a boundary with heterogeneity, some molecular chains in the melt attain liquid crystal orientation because the molecular chains are elongated due to "topological interaction" with the boundary, and the melt becomes "Oriented melt" (e.g., see Non Patent Literatures 2 and 3). Here, the "topological interaction" is an effect of "string-like polymer chains pulling each other because the polymer chains are entangled". The topological interaction is well known as an interaction unique of the polymer. The inventors of the present invention are first to report a theory of the topological crystallization mechanism of polymers, explaining how the ECC and FCC are formed. This theory is called "sliding diffusion theory" and is recognized worldwide (see Non Patent Literature 7).

Moreover, the inventors of the present invention report, through an elucidation of a generation mechanism of "spiralite" found in a shear flow crystallization at a low shear strain rate of 0.01 to 0.1 $s^{-1}$, a general mechanism that in shear crystallization, a shear strain rate of a polymer melt remarkably increases at an interface of solid and liquid phases, which causes an increase in an elongation strain rate, and by this increase, the molecular chains are elongated to locally form the oriented melt, thereby remarkably speeding up nucleation and growth speed (see Non Patent Literature 4).

The inventors of the present invention considered that the polymer crystallization will be facilitated and high crystallinity can be achieved if the entire polymer melt becomes the oriented melt by applying a large elongation strain rate which exceeds the "critical" elongation strain rate (called critical elongation strain rate) of the polymer melt. Further, the inventors of the present invention considered that, if the entire polymer melt can be crystallized with orientation, a crystal structure in which a majority of the molecular chains of the polymer are oriented can be produced. Moreover, the inventors of the present invention considered that, in this case, the nucleation is significantly facilitated and a vast number of nuclei are generated between molecular chains without adding a nucleating agent thereto. This eliminates the need of the addition of the impurity and allows a crystal size to be in nanometer order. It is expected that this leads to obtaining polymer crystals with high transparency and with a dramatically improved mechanical strength and heat tolerance.

The inventors of the present invention diligently conducted studies on the basis of the foregoing original ideas, and succeeded in producing a polymer nano oriented crystal material (NOC material) containing, as main component, polymer nano oriented crystals (referred to as NOCs) in which a crystal size is in nanometer order and polymer chains are oriented to a great extent, by elongating a melt of a polymer (also called "polymer melt") at an elongation strain rate not slower than a critical elongation strain rate, to make the polymer melt into an oriented polymer melt, and thereafter cooling the oriented polymer melt in that state for crystallization (for example, see Patent Literatures 1 and 2). Note that, in Patent Literatures 1 and 2, the NOC material is referred to as "polymer oriented crystals" or "polymer crystals". The NOC material is excellent in properties such as mechanical strength, heat tolerance and transparency, and shows a promise of becoming novel material that can replace conventional industrial materials.

CITATION LIST

Patent Literatures

Patent Literature 1
International Publication No. 2007/026832 brochure (International Publication Date: Mar. 8, 2007)
Patent Literature 2
International Publication No. 2008/108251 brochure (International Publication Date: Sep. 12, 2008)

Non Patent Literatures

Non Patent Literature 1
A. Keller, M. J. Machin, J. Macromol. Sci., Phys., B1(1), pp. 41-91 (1967)
Non Patent Literature 2
S. Yamazaki, M. Hikosaka et al., Polymer, 46, 2005, pp. 1675-1684.
Non Patent Literature 3
S. Yamazaki, M. Hikosaka et al., Polymer, 46, 2005, pp. 1685-1692.
Non Patent Literature 4
K. Watanabe et al., Macromolecules 39(4), 2006, pp. 1515-1524.
Non Patent Literature 5
B. Wunderlich, T. Arakawa, J. Polym. Sci., 2, pp. 3697-3706 (1964)
Non Patent Literature 6
M. Fujiyama, "Structure of Skin Layer of Extruded Polypropylene", Polymer Preprints, 32(7), pp. 411-417 (1975)
Non Patent Literature 7
M. Hikosaka, Polymer, 1987, 28, pp. 1257-1264

SUMMARY OF INVENTION

Technical Problem

The inventions disclosed in Patent Literatures 1 and 2 uniquely found by the inventors of the present invention allowed for (i) producing a film which contains NOCs (i.e., NOC material in the form of a film) by making a film of an oriented polymer melt and crystallizing the film while keeping orientation and (ii) producing a molded object which contains NOCs (i.e., a molded object made of NOC material) by pouring an oriented polymer melt into a predetermined mold and crystallizing the oriented polymer melt while keeping orientation. In other words, the inventions disclosed in Patent Literatures 1 and 2 made it possible to produce a primary-formed object made from an NOC material.

In order to use an NOC material widely and conveniently as an industrial material, a so-called secondary-molding technique is required. The secondary-molding technique is for example (i) a technique of molding an NOC material by press molding etc. into different shape or (ii) a technique of joining NOC materials by fusing the NOC materials together. Furthermore, if it is possible to fuse an NOC material in the form of pellets or powder, it becomes possible to produce another molded product from such an NOC material in the form of pellets or powder. Moreover, if it is possible to fuse NOC material fragments together, it becomes possible to cut a used product made of an NOC material (NOC product) into pieces and reuse the pieces to produce another NOC product.

Note, however, that the NOC material has high heat tolerance and dramatically high mechanical strength as compared to a non-NOC material (i.e., material containing polymer crystals other than NOCs and/or amorphous polymers), and thus is difficult to secondary-mold as compared to the non-NOC material. Furthermore, it has been considered that, since a melt obtained by melting an NOC material at high temperatures is not an oriented polymer melt, in order to obtain a secondary-molded NOC object, it is necessary to (i) again elongate a polymer melt obtained by melting the NOC material, at an elongation strain rate not slower than a critical elongation strain rate to prepare an oriented polymer melt and (ii) crystallize the oriented polymer melt while keeping the orientation of the melt. As is clear from above, secondary-molding of the NOC material has a problem of time and cost.

In view of the problems, an object of the present invention is to provide a technique of secondary-molding an NOC material to further improve the convenience of the NOC material as an industrial material.

Solution to Problem

The inventors of the present invention have studied how the behaviors of an NOC material depend on temperature. The study showed that (i) as the temperature of the NOC material is gradually increased from room temperature, NOCs contained in the NOC material undergo transition from an ordered phase (also called "highly ordered phase", especially referred to as "α2 phase" in a case of NOCs made of PP) to a mobile phase (also called "high-temperature crystal phase", especially referred to as "$\alpha_2'$ phase" in a case of NOCs made of PP) at a certain temperature and (ii) as the temperature is further increased, the NOCs finally undergo transition to an isotropic melt (also called "equilibrium melt", hereinafter referred to as "equilibrium melt") in which polymer chains are isotropic. The inventors of the present invention newly found that, when the NOCs undergo transition from the mobile phase to the equilibrium melt, the NOCs are temporality in the state of a "dense entanglement network-melt: DEN melt" in which a crystalline portion (NOCs) of the entanglement network structure is melt but the entanglement network is maintained. The inventors of the present invention further found that the NOC material, which has changed into the mobile phase or the DEN melt, has flexibility and thus can be secondary-molded by press molding etc. Furthermore, surprisingly, it was found that, when the mobile phase or the DEN melt is cooled to room temperature, the mobile phase or the DEN melt changes back into an NOC material in the form of an ordered phase. Note however that, in a case of the DEN melt, the following should be noted: the DEN melt changes back into the NOC material as long as it is cooled in a restrained state (under restrained condition) with such restrained condition that the melt is restricted to make no volume change or in a restrained state (under restrained condition) with such restrained condition that the melt is under tension at high temperatures; however, the DEN melt may become a material (NC material) containing polymer nano crystals (NCs), in which polymer chains are oriented to a lesser extent, if it is cooled in unrestrained state in which the melt is under no tension and free to change (under unrestrained condition). That is, it was found that, by carrying out secondary-molding such as press molding with respect to an NOC material which has changed into the ordered phase or the DEN melt, it is possible to finally obtain a secondary-molded NOC object (or NC object).

It should be noted that the existence of the mobile phase ($\alpha_2'$ phase) of PP has been revealed and reported by the inventors of the present invention (see F. Gu et al, Polymer 43, 2002, pp. 1473-1481 and P. Maitil et. al., Macro molecules, vol. 33, No. 24, 2000, pp. 9069-9075). However, these papers merely show the existence of the $\alpha_2'$ phase, and neither disclose nor suggest that it is possible to secondary-mold the NOC material by changing the NOC material into the mobile phase ($\alpha_2'$ phase). In particular, the papers do not at all disclose that the NOC material, which has once changed into the mobile phase ($\alpha_2'$ phase), changes back into the NOC material in the ordered phase ($\alpha_2$ phase) merely by being cooled to room temperature after being secondary-molded. This cannot be predicted either.

Moreover, as a result of the diligent studies, the inventors of the present invention newly found the existence of a DEN melt. This is completely new finding. It is needless to say that no one can predict that an NOC material, which has once changed into the DEN melt, changes back into the NOC material (or NC material) in the ordered phase ($\alpha_2$ phase) by merely being cooled to room temperature.

The present invention has been made on the basis of the new finding made by the inventors of the present invention. Specifically, a method for secondary-molding an NOC material in accordance with the present invention includes the steps of: (1) heating the NOC material so that the NOC material changes into a mobile phase or a DEN melt; (2) molding the NOC material which changed into the mobile phase or the DEN melt in the step (1); and (3) cooling the NOC material, which has undergone the step (2), until the NOC material changes into an ordered phase.

The present invention also encompasses a secondary-molded object obtained by a method for secondary-molding an NOC material in accordance with the present invention, which secondary-molded object is constituted by a plurality of NOC materials fused together.

Advantageous Effects of Invention

As has been described, the present invention makes it possible to easily carry out secondary-molding of an NOC material. Accordingly, it is expected that the NOC material will be used as industrial materials far more widely. The NOC material has excellent properties such as high mechanical strength (e.g., breaking strength, rigidity and toughness), high heat tolerance and high transparency, and particularly has a mechanical strength as high as that of metal. Therefore, the NOC material shows great promise of replacing not only polymer material but also metal. If the NOC material can be used as an alternative to metal, it is possible to reduce the weight of all sorts of products without reducing their mechanical strengths. For example, if the NOC material is applied to interior and exterior parts for vehicles, it is possible to reduce the weight of a vehicle to a fraction of the original weight, and thus possible to dramatically improve energy efficiency. This significantly contributes to reduced energy requirements.

Furthermore, the present invention allows for reuse of NOC materials. This results in oil resource savings, and in a reduction of loads on the environment.

Figure 19:
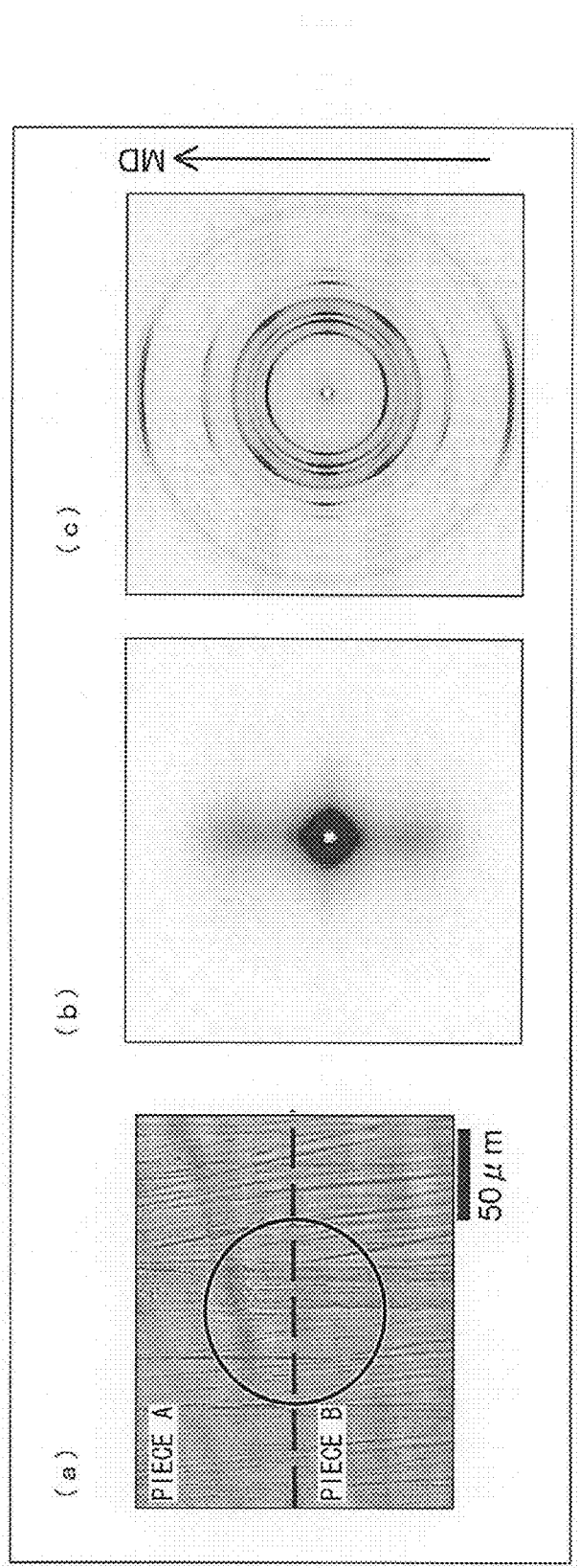

(a) of FIG. 19 is a polarization microscopic photograph of NOC material that was produced by contacting end surfaces of two sheets of NOC material to each other in a mold, heating the two sheets of NOC material at 185° C. to thereby fuse the end surfaces with each other, and allowing the two sheets thus fused to cool to room temperature, (b) of FIG. 19 is a SAXS image of a part where the end surfaces are fused with each other, and (c) of FIG. 19 is a WAXS image of the part where the end surfaces are fused with each other.

Figure 20:
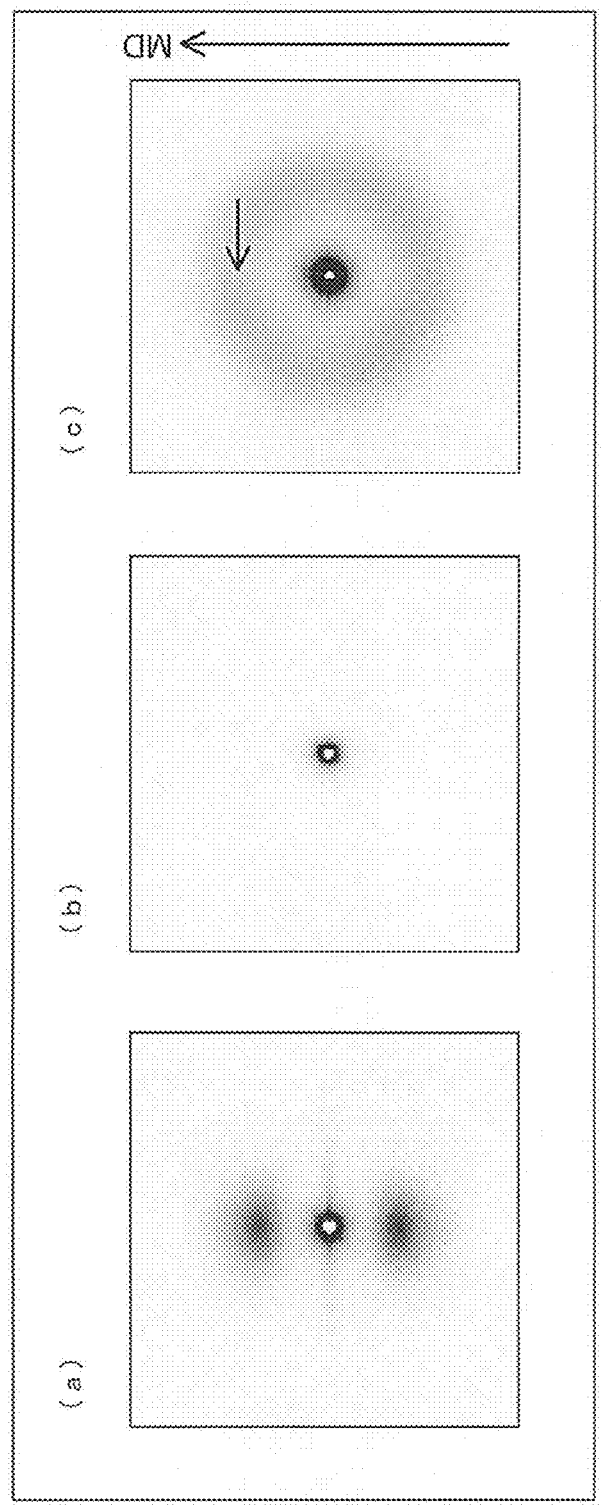

FIG. 20 shows two-dimensional scattering patterns of a sample whose temperature was changed from room temperature to 210° C., and then back to room temperature, which two-dimensional scattering patterns were obtained by a SAXS method. (a) of FIG. 20 shows a two-dimensional scattering pattern obtained from a sample that had not been heated yet, (b) of FIG. 20 shows a two-dimensional scattering pattern obtained from a sample that was heated, and (c) of FIG. 20 shows a two-dimensional scattering pattern obtained from a sample that was allowed to cool in a condition in which the sample was under no tension and free to change (under unrestrained condition).

Figure 21:
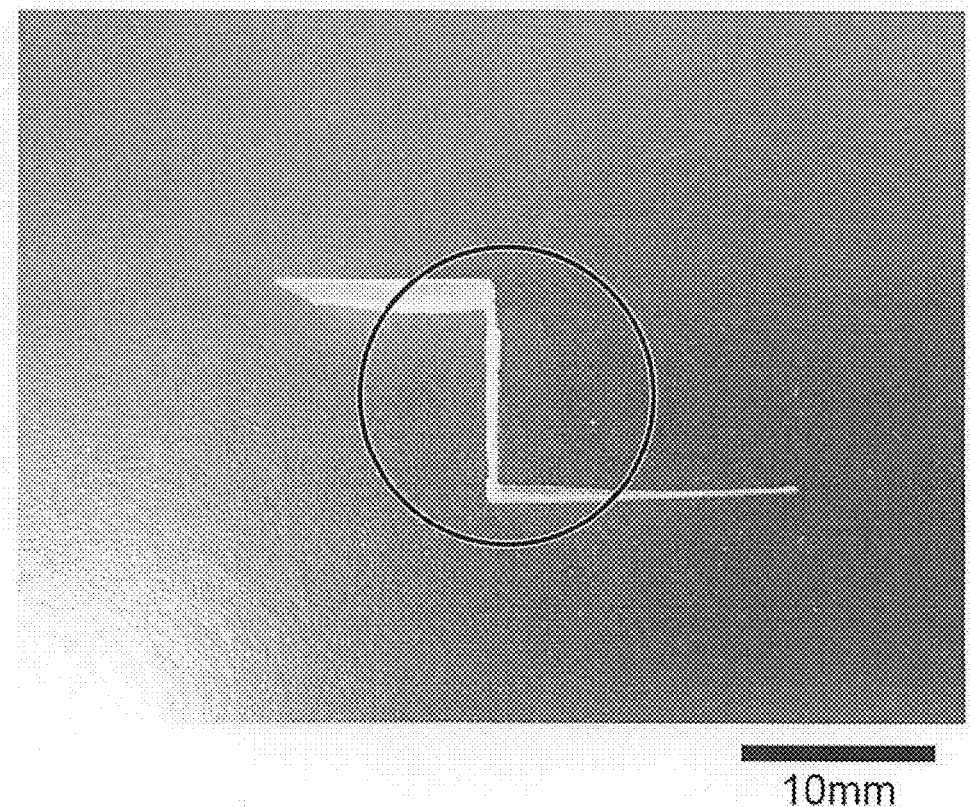

FIG. 21 shows a photograph of a secondary-molded object obtained by heating a sample to 180° C. and secondary-molding the sample.

Figure 22:
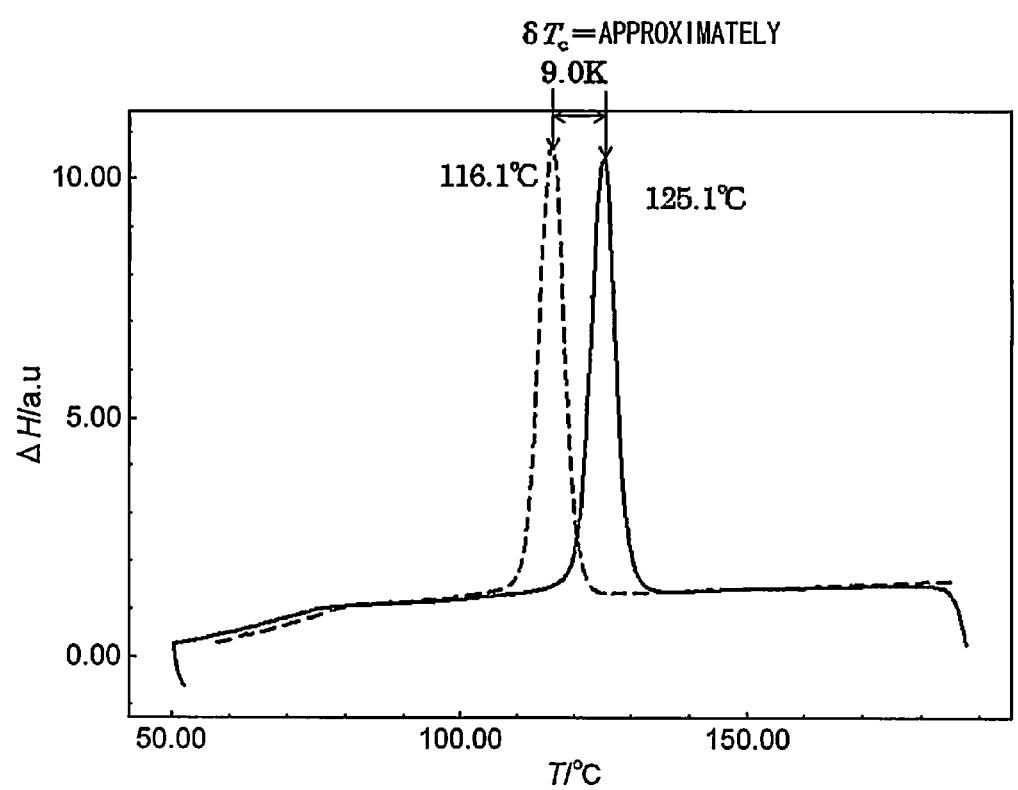

FIG. 22 is a chart showing (I) an enthalpy change ($\Delta H$) of NOC material which was heated to 188° C. and was elongated and formed at an elongation strain rate of 419 ($sec^{-1}$), and was cooled at a rate of temperature decrease of 10 K/min and (II) an enthalpy change ($\Delta H$) of NOC material which was heated to 230° C. and was elongated and formed at an elongation strain rate of 419 ($sec^{-1}$), and was cooled at a rate of temperature decrease of 10 K/min. A solid line shows a result of the case heating the NOC material to 188° C., and a broken line shows a result of the case heating the NOC material to 230° C.

Figure 23:
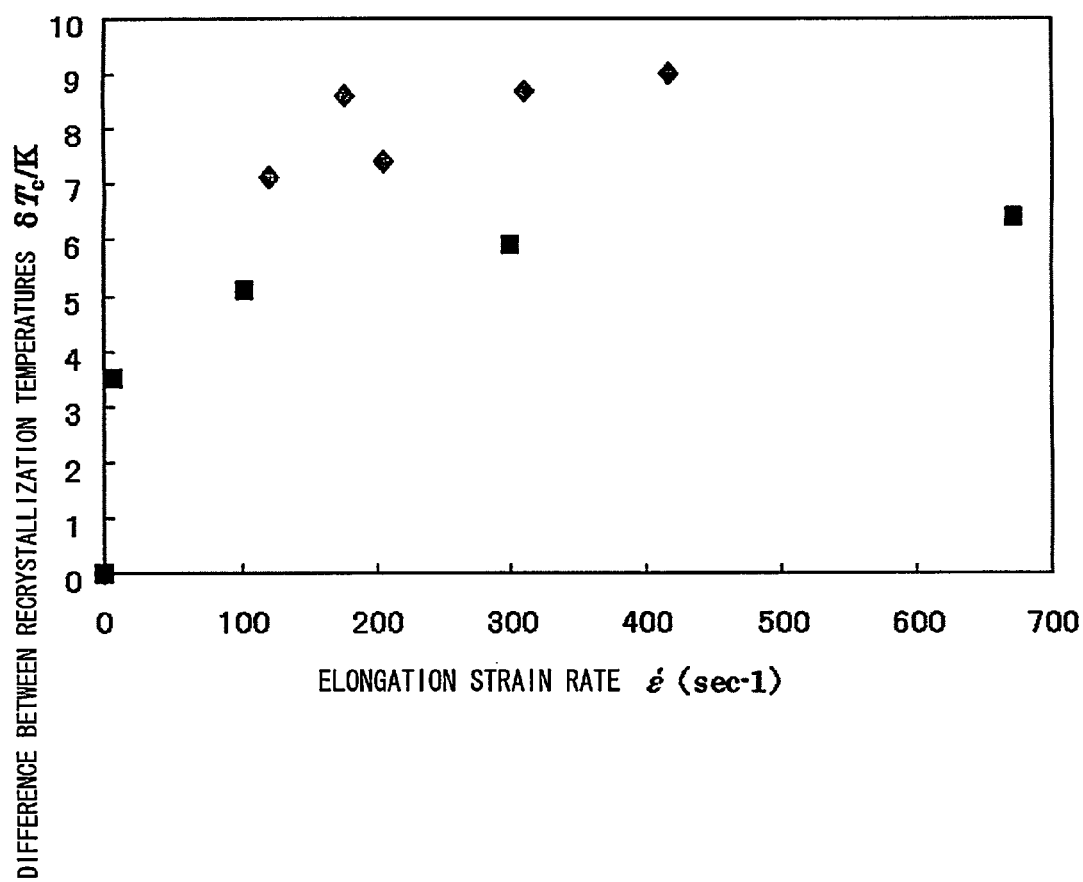

FIG. 23 shows a relationship between (A) a difference ($\delta T_c$) between a recrystallization temperature ($T_c$) of a testing sample formed at various elongation strain rates and a $T_c$ of a testing sample formed at rest and (B) the elongation strain rates. Symbols of a diamond shape indicate results of a case heating NOC material to 180° C. to 190° C., whereas symbols of a square shape indicate results of a case heating NOC material to 190° C. to 200° C.

DESCRIPTION OF EMBODIMENTS

The following description will discuss one embodiment of the present invention. Note, however, that the present invention is not limited to the embodiment, and can be altered in various manners within the scope of the description.

A method for secondary-molding an NOC material in accordance with the present invention (such a method is hereinafter referred to as a "secondary-molding method of the present invention") includes the steps of: (1) heating the NOC material so that the NOC material changes into a mobile phase or a DEN melt; (2) molding the NOC material which changed into the mobile phase or the DEN melt in the step (1); and (3) cooling the NOC material, which has undergone the step (2), until the NOC material changes in to an ordered phase. As used herein, the "secondary-molding an NOC material" means that a formed NOC object, which is an NOC material, is subjected to molding such as press molding. The "secondary-molding" means molding that is carried out after primary-forming for producing an NOC material. It should be noted that, in the art, primary-forming is represented as "forming" and secondary-molding is represented as "molding".

The secondary-molding method of the present invention can further include the step(s) that can be carried out in the technical fields related to molding of polymer materials. Examples of the step include: press molding, stretch molding, roll molding, drawing molding, welding molding, fusion molding and vacuum molding.

The following description discusses (1) the heating step, (2) the molding step and (3) the cooling step. Note, however, that the present invention is not limited to these steps.

<1. Heating Step>

The heating step of the secondary-molding method of the present invention is a step of heating a polymer nano oriented crystal material (NOC material) so that the NOC material changes into a mobile phase or a DEN melt.

(1-1) NOC Material

Note here that the "NOC material" means a material that contains NOCs (polymer nano oriented crystals) as main component. The phrase "contains NOCs as main component" means that the NOCs are contained in an amount of not less than 70%, preferably not less than 80%, further preferably not less than 90%, and most preferably not less than 95%. The "NOCs" means polymer crystals that constitute an NOC material, and is distinguished from the "NOC material".

Examples of the NOC material include polymer crystals described in Patent Literatures 1 and 2. The NOC material is produced by (i) elongating a polymer melt at an elongation strain rate not slower than a critical elongation strain rate, to thereby obtain an oriented polymer melt and (iii) crystallizing the oriented polymer melt. The NOC material is excellent in properties such as mechanical strength, heat tolerance and transparency. Therefore, the NOC material has been attracting attention as various industrial materials. In particular, the NOC material shows promise of replacing metal material.

The polymer which constitutes the NOC material is not particularly limited, and may be so-called general-purpose plastics such as polyethylene (PE), polypropylene (hereinafter referred to as "PP"), and polystyrene (PS), or may be so-called engineering plastics such as polyethylene terephthalate (PET), nylon, or fluoroplastic such as Teflon (registered trademark). If the inexpensive general-purpose plastics can be used in replacement of the engineering plastics by improving properties such as mechanical property, heat tolerance, and transparency, it is possible to remarkably reduce costs of industrial parts and the like made of resin. Hence, it is advantageous to prepare the NOC material from the general-purpose plastics. Furthermore, PP is preferable among the general-purpose plastics, because PP has preferable properties such as high heat tolerance and high mechanical strength as compared to other general-purpose plastics. Moreover, among PP, isotactic polypropylene (hereinafter, referred to as "iPP" where appropriate) is particularly preferable. This is because iPP has good crystallinity due to its structure in which methyl groups are oriented in one direction, thereby allowing for easy obtainment of the NOC material. Moreover, the NOC material prepared from iPP can attain finer NOCs more easily than that prepared from normal PP. As a result, it is possible to obtain an NOC material having a higher transparency.

It should be noted that, although the specification of the present application explains NOC materials made of PP and iPP as typical NOC materials, materials for NOCs and an NOC material are not limited to PP and iPP in terms of NOC formation principle. Usually, all molecular chains in polymer melts are in the form of random coils. When such a polymer melt is elongated at an elongation strain rate not slower than a critical elongation strain rate, an oriented melt in which polymer chains are elongated and oriented is obtained. In such an oriented melt, the polymer chains are easy to associate with each other and homogeneous nucleation is easy to occur. This leads to formation of NOCs. It is clear from this that NOCs and NOC material can be produced from any polymers.

The NOC material may be composed of a single polymer or a mixture of a plurality of types of polymers. For example, it is possible to combine PP, PE, polybutene-1 and the like as appropriate. A combination of the plurality of types of polymers allows for compensating a physical drawback in one type of polymer with another polymer. The blend ratio of the polymers may be set as appropriate in accordance with its purpose.

The NOC material has a crystallinity of not less than 70%, preferably not less than 80%, further preferably not less than 90%, and most preferably not less than 95%. The "crystallinity of an NOC material" denotes a proportion of crystals contained in the NOC material. The crystallinity of the NOC material can be examined by a publicly known method. For example, the crystallinity can be determined by a density method using mass M and volume V (see L. E. Alexander, "X-ray diffraction of polymers (vol. one)", *Kagaku-Dojin*, 1973, p. 171). A crystallinity $X_c$ of the NOC material is calculated by the following formula:

$$\chi_c = \frac{\rho_c}{\rho}\left(\frac{\rho - \rho_a}{\rho_c - \rho_a}\right) \quad \text{[Math. 1]}$$

In the foregoing formula, ρ represents a density of a sample, $\rho_a$ represents an amorphous density, and $\rho_c$ represents a crystal density. Note that values written in literature can be used as pa and $\rho_c$ (see Qirk R. P. and Alsamarriaie M. A. A., Awiley-interscience publication, New York, Polymer Handbook, 1989). For example, according to the Polymer Handbook, the crystal density and the amorphous density of iPP are $\rho_a$=0.855 (g/cm$^3$) and $\rho_c$=0.936 (g/cm$^3$), respectively. Meanwhile, the density ρ of the sample is obtained by the following formula:

$$\rho = M \div V (\text{g/cm}^3) \quad \text{(Formula)}$$

wherein M is mass (g) of the sample and V is volume (cm$^3$) of the sample.

Further, the crystal contained in the NOC material has a size d of not more than 300 nm, preferably not more than 100 nm, further preferably not more than 50 nm, further preferably 30 nm or less, and further preferably 20 nm or less. The size d of the crystal can be measured by, for example, the publicly known small-angle X-ray scattering method (SAXS method) or the wide-angle X-ray scattering method (WAXS method).

The X-ray scattering method can be performed, for example, by the small-angle X-ray scattering method (SAXS method) or the wide-angle X-ray scattering method (WAXS method). Examples of experimental facilities to which the X-ray scattering method can be applied include SPring-8, Beam Line BL40B2 run by Japan Synchrotron Radiation Research Institute (JASRI), and Photon Factory (PF), Beam Line BL10C run by High Energy Accelerator Research Organization (KEK). Further, a wavelength (λ) of an X-ray for use in detection is, for example, λ=0.072 nm or λ=0.15 nm. As a detector, an Imaging Plate, a position-sensitive detector (PSPC), or the like can be used.

Further, since, in the SAXS method, a primary peak of a curve of the small-angle X-ray scattering intensity ($I_x$) against the scattering vector (q) corresponds to a shortest distance between microcrystals (=crystal size d) in cases where microcrystals of an average size d are randomly packed (see A. Guinier, "*Ekkusu-sen Kessyogaku no Riron to Jissai*" (Theory and Practice of X-ray Crystallography), Rigaku Corporation, p. 513, 1967), the crystal size d is calculated by the Bragg equation:

$$d = 2\pi \div q \quad \text{Bragg equation}$$

According to Hall-Petch's law (see *Nano Materiaru Kogaku Taikei* (Handbook for Nanomaterials), Vol. 2, *Nano Kinzoku* (Nanometals), Fujitec Corporation, 2005, p. 20), it is known that the strength of a crystal increases in proportion to an inverse of a square root of the crystal size d. Therefore, for example, in a case where the crystal size d changes from 1 μm to 10 nm, the strength increases tenfold ($\sqrt{100}=10$)

Further, an orientation function $f_c$ representing a degree of orientation of polymer chains within crystals contained in the NOC material is not less than 0.7, is preferably not less than 0.8, and is further preferably not less than 0.9. The orientation function $f_c$ can be measured by, for example, the publicly known wide-angle X-ray scattering method (WAXS method). Measurement of the orientation function $f_c$ by the WAXS method may be carried out by using an X-ray scattering intensity analysis software (R-axis display; manufactured by Rigaku Corporation), in a case where the Imaging Plate is used as a detector for example. For details of how the orientation function $f_c$ is calculated, refer to the description in Examples later described. In a case of a crystalline polymer, the larger the orientation function $f_c$ is, the more the mechanical strength in the MD direction increases. Hence, the orientation function is important in obtaining high performance material.

Figure 1:
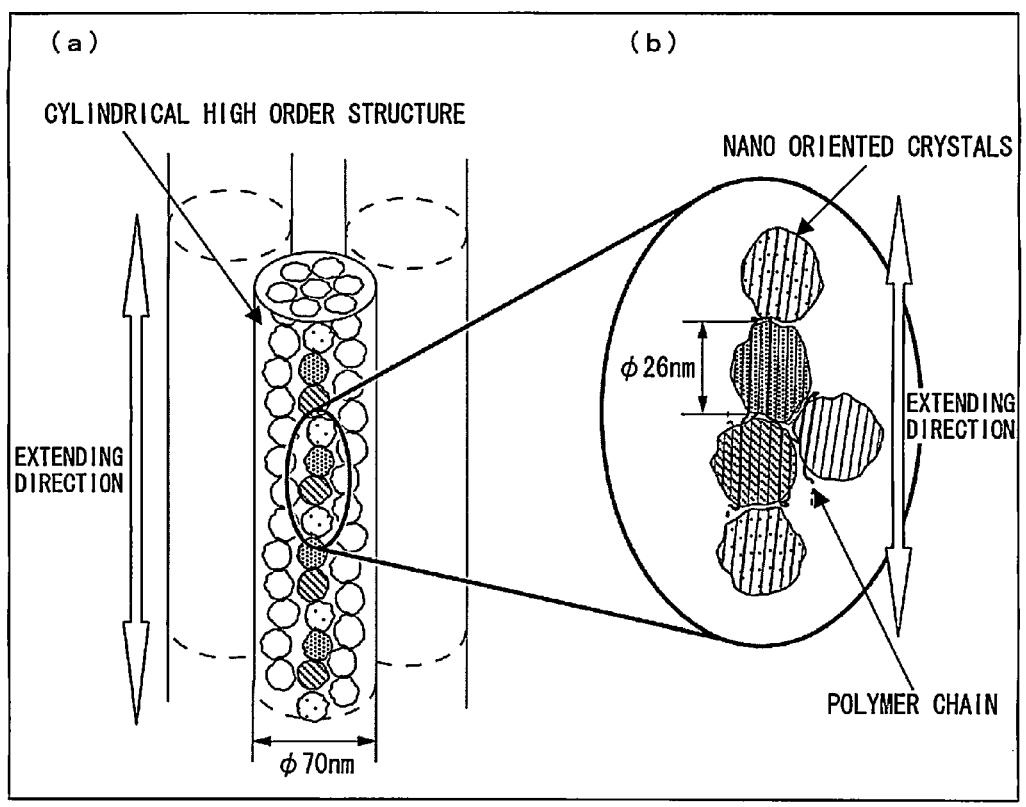
FIG. 1 is a view schematically illustrating a cylindrical high order structure contained in NOC material.

Furthermore, the NOC material contains a cylindrical high order structure. The cylindrical high order structure includes a bundle of strings each of which is constituted by NOC particles (nano oriented crystal particles) connected together. FIG. 1 schematically illustrates the cylindrical high order structure for more specific description of the cylindrical high order structure. (a) of FIG. 1 illustrates one example of the NOC material in which cylindrical high order structures each having a diameter of approximately 70 nm are arranged. The broken lines in (a) of FIG. 1 each show a cut end. The cylindrical high order structures have different heights. The NOC particles run in rows like irregular rosaries in the cylindrical high order structure, and a bundle of approximately more than ten rosaries are included in the cylindrical high order structure. (b) of FIG. 1 is an enlarged view inside the cylindrical high order structure. According to (b) of FIG. 1, the NOC particles and the polymer chains are oriented in the extending direction. Moreover, one polymer chain penetrates through a plurality of NOC particles while reciprocating.

The diameter φ of a cylindrical high order structure included in the NOC material is not more than 300 nm, preferably not more than 200 nm, and further preferably not more than 100 nm. The diameter φ of the structure may be measured, for example, by the publicly known small-angle X-ray scattering method (SAXS method). The curve of the small-angle X-ray diffuse scattering intensity ($I_x$) against the scattering vector (q$^2$), of the SAXS method, provides a form factor due to its own scattering, for each cylindrical high order structure (see A. Guinier, "*Ekkusu-sen Kessyogaku no Riron to Jissai*" (Theory and Practice of X-ray Crystallography), Rigaku Corporation, p. 555-556, 1967), and the diameter φ is calculated from a radius of inertia $R_g$ by applying an approximated curve by Guinier plot.

$$Ix = A\exp(-R_g^2 q^2/3) \quad \text{Formula of Guinier plot,}$$

where $-R_g^2 q^2/3$ is smaller than 1

(Formula)

$$\phi = 2\sqrt{\frac{5}{3}} R_g \quad \text{[Math. 2]}$$

Note that A in the formula of the Guinier plot is a constant value.

The NOC material made of, for example, iPP has a tensile strength at break of not less than 100 MPa and preferably not less than 0.21 GPa, which tensile strength at break is measured by a method in conformity with a tensile test method of JIS K7127, and has a tensile modulus of not less than 3 GPa and preferably not less than 4 GPa. As a tensile tester for measurement, a precision universal tester manufactured by Shimadzu Corporation (autograph AG-1kNIS) is used, and a test piece having a size of a gauge length of 7 mm to 10 mm, a width of a narrow parallel part of 1.5 mm to 3.0 mm, and a thickness of 0.2 mm 0.4 mm is used. For details of the tensile test, refer to the description in Examples later described.

A tensile modulus (Young's modulus, modulus of direct elasticity) is a constant which determines a value of strain with respect to stress within a range of elasticity.

[Strain ε]=[Stress σ]/[tensile modulus E] (Hooke's law)

The tensile modulus is calculated in conformity with a method disclosed in JIS K7161. Namely, the tensile modulus can be calculated from the amount of strain with respect to the direction of one-way stretching or compression stress, and corresponds to the slope of a linear portion of a stress-strain curve according to the Hooke's law, whose vertical axis represents stress and whose horizontal axis represents strain. For details of how to calculate the tensile modulus, refer to the description in Examples later described. The tensile strength at break and the tensile modulus are measured at room temperature (25° C.).

In the NOC material made of, for example, iPP, a haze value (thickness of 0.3 mm) of a test piece having a thickness of 0.3 mm, which haze value is measured by a haze measuring method devised by the inventors of the present invention, is a value not more than 10% (preferably not more than 5%, further preferably not more than 1%). In this specification, "a haze value (thickness of 0.3 mm)" denotes "a haze obtained by (i) measuring an optical density using a test piece having a thickness of 0.3 mm, and (ii) converting this value by use of a "calibration curve of haze against optical density". The haze measuring method is carried out by measuring the amount of transmission light which transmits through the test piece. The haze measuring method may be carried out by an apparatus including an optical microscope (BX51N-33 P-OC; manufactured by Olympus Corporation) which uses a halogen lamp or the like as a light source of white light, a CCD camera (cooled digital camera QICAM; manufactured by QImaging), and an image-analysis software (Image-Pro PLUS; manufactured by Media Cybernetics, Inc.) capable of measuring optical density. The white light, which is the beam used for the measurement, is to enter the test piece as a round shape having a diameter of 1 mm. The optical density can be converted into the haze by use of the "calibration curve of haze against optical density". The "calibration curve of haze against optical density" can be obtained by plotting a haze with respect to an optical density, with use of hazes of 20 positions in a polypropylene sheet measured according to JIS K7105 and the optical density of the polypropylene sheet measured by the haze measuring method.

Further, the NOC material made of, for example, iPP has a heat distortion temperature of not less than 160° C., preferably not less than 170° C., and further preferably not less than 175° C., which heat distortion temperature is measured by a test-piece size direct-reading method (method for directly reading the size of a test piece) with use of an optical microscope. The test-piece size direct-reading method is a method uniquely devised by the inventors of the present invention, and the heat distortion temperature can be measured as described in the following description. An apparatus used for measurement is an optical microscope with a CCD camera (BX51N-33P-OC; manufactured by Olympus Corporation), a hot stage (L-600A; manufactured by Linkam Scientific Instruments Ltd.), and an image-analysis software (Image-Pro PLUS; manufactured by Media Cybernetics, Ltd.) that can measure a size displayed on a screen. The measurement uses a test piece having a length of 0.7 mm, a width of 0.7 mm, and a thickness of 0.2 mm to 0.4 mm. The test piece is heated by a temperature increase rate of 1 K per minute, and a temperature at which the test piece started to shrink or expand by 3% or more in a length direction (MD) or a width direction (TD) serves as the heat distortion temperature.

(1-2) Phase and State of NOC Material

As described earlier, the inventors of the present invention have studied how the behaviors of an NOC material depend on temperature. The study showed that (i) as the temperature of the NOC material is gradually increased from room temperature, crystals contained in the NOC material undergo transition from an ordered phase ($α_2$ phase) to a mobile phase ($α_2'$ phase) at a certain temperature, (ii) as the temperature is further increased, the crystals change into a DEN melt and (iii) as the temperature is further increased, the crystals finally change into an equilibrium melt in which polymer chains are isotropic.

Figure 2:
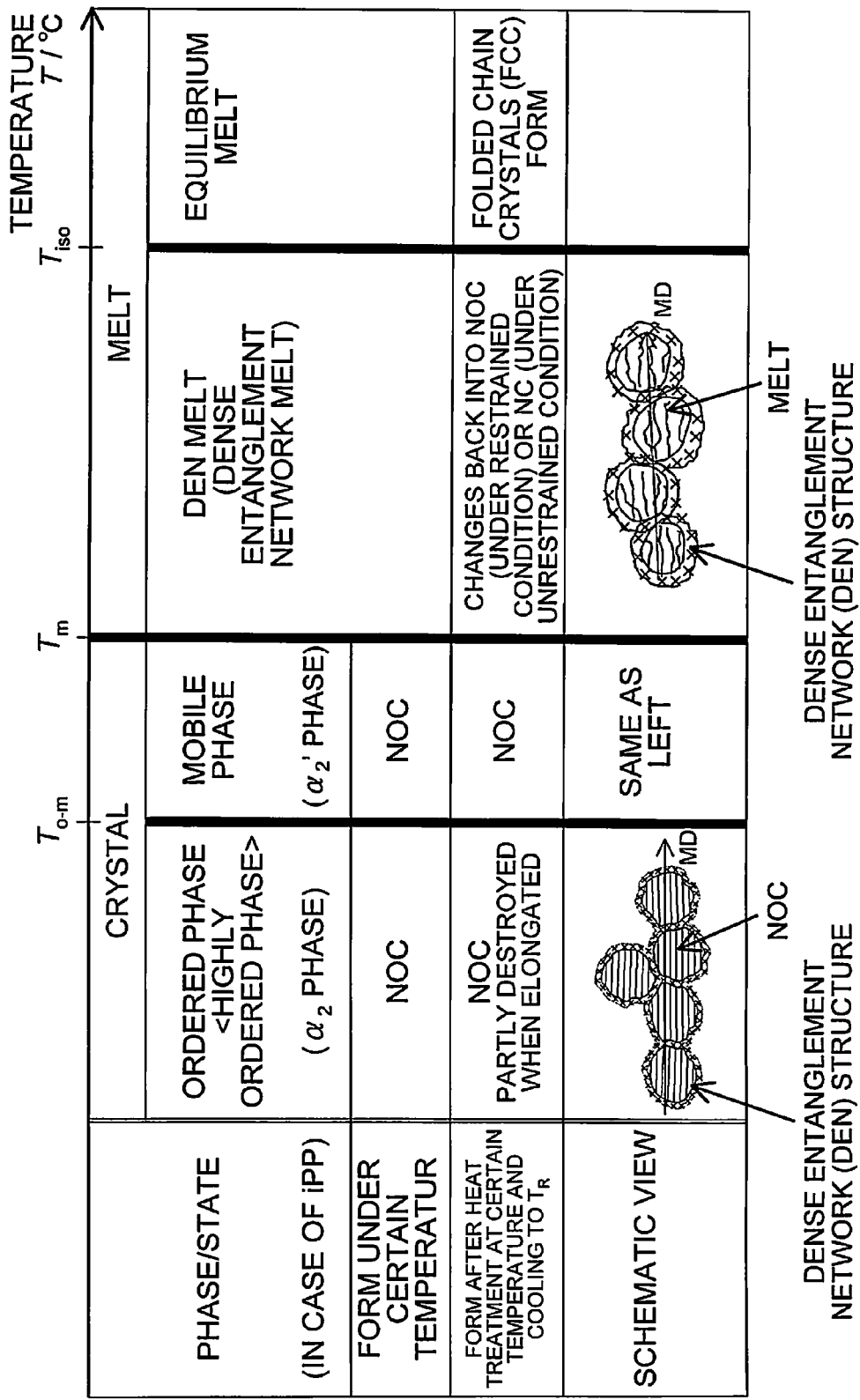
FIG. 2 is a view schematically illustrating phases and states of NOC material at certain temperatures.

FIG. 2 schematically shows how the phase and state of an NOC material change.

NOCs are in an ordered phase (called $a_2$ phase in a case of PP) at temperatures from room temperature (TR) to less than an "ordered phase-mobile phase transition temperature" ($T_{o-m}$). The ordered phase ($α_2$ phase) is a highly ordered phase. The structure of the $α_2$ phase is more excellent in properties such as mechanical strength and heat tolerance than an $α_1$ phase. Note that the $α_1$ phase is a poorly ordered phase in which the structure is out of order (see M. Hikosaka, Polymer Journal 1973 5 pp. 111-127). In the ordered phase ($α_2$ phase), an NOC is structured such that NOC particles aligned along an extending direction (MD direction) are strongly tangled with each other with a polymer chain (dense entanglement network structure: DEN structure) (see FIG. 2).

When an NOC material is heated, the NOC material undergoes transition from the ordered phase ($α_2$ phase) to the mobile phase ($α_2'$ phase) at the "ordered phase-mobile phase transition temperature" ($T_{o-m}$). For example in a case where an NOC material made of iPP is heated, the NOC material undergoes transition to the mobile phase ($α_2'$ phase) at approximately 157° C. (see F. Gu et al, Polymer 43, 2002, pp. 1473-1481). The mobile phase ($α_2'$ phase) is a crystal phase that is stable at high temperatures, and is substantially the same as the foregoing NOC material in morphology. Note, however, that the mobile phase ($\alpha_2'$ phase) is different from the ordered phase ($\alpha_2$ phase) in that it has flexibility and thus can be secondary-molded by press molding etc.

When the NOC material is further heated, the mobile phase ($\alpha_2'$ phase) changes into a DEN melt at a melting point ($T_m$). For example in a case of an NOC material made of iPP, the NOC material changes into the DEN melt at approximately 170° C. The DEN melt is, as shown in FIG. 2, such that a crystalline portion (NOCs) of the dense entanglement network (DEN) structure has melted but the dense entanglement network structure is maintained. It can be said that the DEN melt is an oriented melt and, at the same time, a liquid crystal-like state. Therefore, it can be said that the DEN melt is nano oriented liquid crystal (NOLC). Since the DEN melt is an oriented melt, it is needless to say that the DEN melt has flexibility. Therefore, the DEN melt is capable of being secondary-molded by press molding etc. It should be noted that such a state of the DEN melt is a new finding which was first discovered to exist by the inventors of the present invention.

When the DEN melt is heated, the DEN melt changes into an equilibrium melt at an isotropic melt transition temperature ($T_{iso}$). For example in a case of an NOC material made of iPP, a DEN melt changes into the equilibrium melt (isotropic melt) at approximately 215° C.

The equilibrium melt is a melt in which the DEN structure is completely destroyed and polymer chains are not oriented.

It is possible to determine whether a sample is in the state of an ordered phase ($\alpha_2$ phase), mobile phase ($\alpha_2'$ phase), DEN melt or equilibrium melt, by for example the known wide-angle X-ray scattering method (hereinafter referred to as "WAXS method") or the known small-angle X-ray scattering method (SAXS method). For details of how to make the determination, refer to the description in Examples (described later). Furthermore, each of the temperatures "$T_{o-m}$", "$T_m$" and "$T_{iso}$" can be determined by subjecting a sample, whose temperature has been increased by heat, to the WAXS method or the SAXS method to thereby check the phase and state of the sample. Since each of the temperatures depends on the type, molecular weight, crystallization rate and a degree of orientation etc. of polymers that constitute an NOC material, the temperatures can be determined for each NOC material. In a case of an NOC material made of iPP which was used in Examples (described later), $T_{o-m}$ is approximately 157° C., $T_m$ is approximately 170° C., and $T_{iso}$ is approximately 215° C.

The inventors of the present invention conducted a study, and found that, by (i) heating an NOC material so that the NOC material changes into a mobile phase ($\alpha_2'$ phase) or a DEN melt, and secondary-molding the mobile phase or the DEN melt by press molding etc. and thereafter (ii) reducing the temperature of the mobile phase or the DEN melt to a temperature below $T_{o-m}$ by cooling etc., the mobile phase or the DEN melt changes back into the NOC material or the NC material. In other words, it is possible to obtain a secondary-molded NOC object in the ordered phase ($\alpha_2$ phase) or a secondary-molded NC object in the ordered phase ($\alpha_2$ phase) by (i) heating an NOC material so that the temperature of the NOC material is not less than $T_{o-m}$ but less than $T_{iso}$, (ii) secondary-molding a resultant sample whose temperature is not less than $T_{o-m}$ but less than $T_{iso}$, and thereafter (iii) reducing the temperature of the sample to a temperature below $T_{o-m}$. In a case of the DEN melt, the following should be noted: the DEN melt changes back into the NOC material as long as it is cooled in a restrained state with such restrained condition that the melt is restricted to make no volume change or in a restrained state with such restrained condition that the melt is under tension (preferably at 1 MPa or greater); however, the DEN melt may change into a material (NC material) containing polymer nano crystals (NCs), in which molecular chains are oriented to a lesser extent, if it is cooled in unrestrained state in which the melt is under no tension and free to change. Note, however, that the NC material is still a material that has excellent properties such as high mechanical strength, high heat tolerance and high transparency, as compared to usual folded chain crystals (FCCs). Therefore, the NC material can be used in similar applications to the NOC material.

Since the DEN melt is in a melt state, it is easy to secondary-mold the DEN melt. Therefore, in view of ease of secondary-molding, it is more preferable to carry out the secondary-molding with respect to the DEN melt than to the mobile phase. In particular, in a case of fusing a plurality of NOC materials together, it is preferable to first change the plurality of NOC materials into DEN melts and thereafter fuse them together. This is because this makes it possible to achieve stronger fusion bond. In other words, it is more preferable to (i) heat an NOC material so that the temperature of the NOC material is not less than $T_m$ but less than $T_{iso}$ and thereafter (ii) carry out the secondary-molding.

On the other hand, in the NOC material which has changed into an equilibrium melt, polymer chains are not oriented. Therefore, even if the equilibrium melt is secondary-molded and then its temperature is reduced to a temperature below $T_m$ for crystallization, no NOCs form and instead folded chain crystals (FCCs) form.

Further, it is not possible to secondary-mold an NOC material heated only to a temperature below $T_{o-m}$, i.e., an NOC material in the ordered phase, because such an NOC material does not have flexibility. If excess force is applied to carry out secondary-molding, the structure of the NOC material may be physically destroyed.

In the secondary-molding method of the present invention, means for heating an NOC material in a phase transition step is not particularly limited provided that it is capable of heating the NOC material to a temperature within a desired range (not less than $T_{o-m}$ but less than $T_{iso}$, more preferably not less than $T_m$ but less than $T_{iso}$). The means can be selected from known heating means as appropriate, depending on the shape and size etc. of the NOC material and how the NOC material is secondary-molded. For simplicity, an NOC material can be (i) placed in a furnace (electric furnace, gas furnace etc.) and heated to a desired temperature or (ii) placed on a plate heater and heated to a desired temperature. For continuous phase transition steps, an NOC material can be (i) placed on carrying means such as a belt conveyor, (ii) carried into a furnace by the belt conveyor and (iii) heated to a desired temperature while being carried through the furnace.

<2. Molding Step>

The molding step is a step of molding an noc material which changed into the mobile phase ($\alpha_2'$ phase) or the DEN melt in the heating step. How to carry out the molding in the molding step is not particularly limited, and is for example molding the NOC material into a desired shape by press molding, stretch molding, roll molding, drawing molding, welding molding, fusion molding or vacuum molding etc. More specifically, by pressing a sheet-shape NOC material which is in the mobile phase ($\alpha_2'$ phase) or the DEN melt with a mold of an appropriate shape, it is possible to obtain a secondary-molded object made of the NOC material (or NC material) and having a desired shape. It should be noted that a secondary-molded object obtained by secondary-molding an NOC material, which secondary-molded object is a final product obtained by the secondary-molding method of the present invention, is referred to as a "secondary-molded NOC object".

In the molding step, a plurality of NOC materials can be stacked on top of each other and fused and joined together. More specifically, a sheet-shape NOC material(s) and/or a film-shape NOC material(s) can be stacked on top of each other and fused and joined. This makes it possible to finally produce a thick secondary-molded NOC object, which cannot be produced by conventional techniques. The sheet-shape NOC material(s) and/or the film-shape NOC material(s) to be stacked can be of the same NOC materials or different types of NOC materials (e.g., a combination of NOC of PP and NOC of PE). Alternatively, the sheet-shape NOC material(s) and/or the film-shape NOC material(s) can be of a combination of an NOC material and a non-NOC material. By combining different types of NOC materials or combining an NOC material and a non-NOC material, it is possible to finally produce a novel secondary-molded NOC object in the form of a sheet, which has the physical properties unique to respective NOC materials.

As is clear from above, it can be said that the present invention also encompasses a secondary-molded NOC object obtained by the secondary-molding method of the present invention, which secondary-molded NOC object is made up of a plurality of NOC materials fused together. In this secondary-molded NOC object, the plurality of NOC materials are fused together. Therefore, such a secondary-molded NOC object is equivalent to a primary-formed NOC object in terms of properties such as mechanical strength, heat tolerance and transparency.

Furthermore, the molding step can include molding and/or extrusion molding, by which to pour, into a mold, a material made up of fused NOC material powder and/or NOC material particles which are fused together. The NOC material powder and the NOC material particles are advantageous in that they can be packed into a package such as a bag at high density and thus are easy to put into general use as industrial materials. Further, it is possible to produce a high-performance secondary-molded NOC object from such an NOC material. Moreover, a used product made of an NOC material ("NOC product") can be cut into pieces, and the pieces can be used as the foregoing NOC material powder or the NOC material particles. This makes it possible to reuse NOC materials and thus possible to save precious resources (e.g., oil resources).

The molding in the molding step is not limited to one (1) molding. The same type of molding can be carried out two or more times, and different types of molding can be carried out in combination. This makes it possible to produce a secondary-molded NOC object that has a more complicated shape.

It should be noted that, in some cases, the molding step includes an aspect in which an NOC material, which has once changed into a mobile phase ($\alpha_2'$ phase) or a DEN melt, is merely allowed to stand without being subjected to molding.

<3. Cooling Step>

The cooling step is a step of cooling an NOC material, which has undergone the molding step, until the NOC material undergoes transition to the ordered phase ($\alpha_2$ phase). In other words, the cooling step is a step of reducing the temperature of an NOC material, which has undergone the molding step, to a temperature below $T_{o-m}$. How to carry out the cooling is not particularly limited, and can be (i) a step of forcing the temperature to be a temperature below Torn by use of known cooling means or (ii) a step of allowing an NOC material, which has undergone the molding step, to stand at room temperature to cool down to a temperature less than $T_{o-m}$. That is, in the cooling step, cooling speed is not particularly limited. The cooling step can be carried out either in a gaseous phase or in a liquid phase.

By the cooling step, an NOC material, which has changed into the mobile phase ($\alpha_2'$ phase) or the DEN melt and undergone the molding step, undergoes transition to change back into the ordered phase ($\alpha_2$ phase), whereby a secondary-molded NOC object is to be obtained. Whether the NOC material has changed back into the $\alpha_2$ phase and become a secondary-molded NOC object can be confirmed by the known WAXS method or the known SAXS method. For details, refer to Examples (described later).

<4. Method of Continuous Secondary-Molding>

A secondary-molding method of the present invention can be carried out batch-wise, but is preferably carried out continuously in industrial application. The secondary-molding method of the present invention can be carried out continuously in the following manner, for example.

(1) An NOC material is placed on a belt conveyor.

(2) The NOC material is carried by the belt conveyor to a furnace where the heating step can be carried out. The belt conveyor here is designed to pass through the furnace. The temperature of the NOC material on the belt conveyor reaches a temperature within a predetermined range (not less than $T_{o-m}$ but less than $T_{iso}$, more preferably not less than $T_m$ but less than $T_{iso}$) while the NOC material is carried through the furnace, and the NOC material changes into the mobile phase ($\alpha_2'$ phase) or the DEN melt.

(3) Secondary-molding (molding step) is carried out, by molding means (e.g., press-molding machine) provided inside the furnace or molding means (e.g., press-molding machine) provided immediately downstream of the furnace, while the NOC material is maintained in the mobile phase ($\alpha_2'$ phase) or the DEN melt. While the secondary-molding (molding step) is carried out, the operation of the belt conveyor can either be continued or suspended.

(4) The NOC material which has undergone the secondary-molding (molding step) is carried by the belt conveyor out of the furnace (in a case where the secondary-molding is carried out outside the furnace, the NOC material is just carried). While being carried, the NOC material on the belt conveyor is allowed to cool or is cooled by appropriate cooling means, whereby the temperature of the NOC material decreases to a temperature below $T_{o-m}$ (cooling step). By the cooling step, the NOC material undergoes transition to change back from the mobile phase ($\alpha_2'$ phase) or the DEN melt into the ordered phase ($\alpha_2$ phase), and becomes a secondary-molded NOC object.

(5) The secondary-molded NOC object, which was obtained through the cooling step, is carried by the belt conveyor and collected by collecting means.

<5. Use of Secondary-Molding Method of the Present Invention>

The secondary-molding method of the present invention can be used in, for example, the following fields. The secondary-molded NOC object made of PP is applicable to a large portion (not less than 90%) of interior parts of automobiles. With utilization of its high strength and high toughness, the secondary-molded NOC object made of PP is applicable to constituent parts and interior and exterior parts of vehicles such as automobiles, airplanes, rockets, trains, vessels, motorbikes, and bicycles, and to machine tool parts and machine members, in replacement of metal. Moreover, with utilization of its high rigidity and its light weight, the secondary-molded NOC object made of PP is applicable to a speaker or a diaphragm for microphones. With utilization of its high transparency, the secondary-molded NOC object made of PP is also applicable to CDs or DVDs in replacement of PC. Moreover, with its high transparency, the secondary-molded NOC object made of PP is applicable as a mask for liquid crystal and plasma displays and the like. With the high transparency, the secondary-molded NOC object made of PP is usable as material for medical supplies, such as a disposable injector, a medicine dropper, and a medicine container. With its high transparency, the secondary-molded NOC object made of PP can be used in replacement of glass for various bottles, glasses, household small-sized tanks to industrial-use large-sized tanks. Moreover, with the high transparency, the secondary-molded NOC object made of PP can be used as a material for contact lenses, lenses for glasses, and various optical lenses. Moreover, the secondary-molded NOC object made of PP can be used as glass for buildings or residences, with utilization of the high transparency. The secondary-molded NOC object made of PP, with the high rigidity, high toughness, and light weight, is applicable to material for extensive sporting goods, such as ski boots, skis, boards, rackets, various nets, tents, and rucksacks. Moreover, with the high rigidity, high toughness, and light weight, the secondary-molded NOC object made of PP can be used as material for handicraft articles such as a needle, scissors, and a sewing machine, and for decorative articles. The secondary-molded NOC object made of PP can be used as material for commercial articles, such as a show window and displaying articles. Moreover, the secondary-molded NOC object made of PP can be used as material for parts and facilities in parks, amusement parks, and theme parks; for example a swing, a seesaw, and a roller coaster. Other than the foregoing, the secondary-molded NOC object made of PP may be used as the following items, for example: structure material and box material for parts of precision apparatuses such as electric, electronic, and information apparatuses, and clocks; stationery goods such as files, folders, pencil boxes, writing materials, and scissors; cooking tools such as kitchen knives, bowls and the like; packaging material for food, sweets, cigarettes, and the like; food containers, tableware, disposable chopsticks, toothpicks; furniture such as home furniture and office furniture; building material, interior material, and exterior material for buildings and residences; material for roads or bridges; material for toys; super strong fibers and thread; fishing equipment, fishing nets, and fishing tools; agricultural tools, agricultural articles; shopping bags and garbage bags; various pipes; garden supplies; and transportation containers, pallets, and boxes.

On the other hand, the secondary-molded NOC object made of PP or PE can be used as super strong fibers. Meanwhile, a secondary-molded fluorine NOC object such as polyvinylidene fluoride, with its high ferroelectricity and piezoelectric properties, is applicable to materials for high-precision ultrasonic wave element fast switching elements, highly-efficient speakers, high sensitivity microphones and the like. On the other hand, the secondary-molded NOC object made of PET is applicable to industrial material which requires a high heat tolerance of approximately 200° C.

As has been described, one embodiment of the present invention is as follows. A method for secondary-molding an NOC material in accordance with the present invention includes the steps of: (1) heating the NOC material so that the NOC material changes into a mobile phase or a DEN melt; (2) molding the NOC material which changed into the mobile phase or the DEN melt in the step (1); and (3) cooling the NOC material, which has undergone the step (2), until the NOC material changes into an ordered phase.

The method for secondary-molding the NOC material in accordance with the present invention can be arranged such that the NOC material comprises NOCs having a crystal size d of not more than 300 nm and an orientation function fc of not less than 0.7, the orientation function fc representing a degree of orientation of polymer chains in crystals.

The method for secondary-molding the NOC material in accordance with the present invention can be arranged such that the NOC material includes a cylindrical high order structure; and the cylindrical high order structure includes a bundle of strings each of which is constituted by nano oriented crystal particles connected together.

The method for secondary-molding the NOC material in accordance with the present invention can be arranged such that the NOC material is made of polyolefin. Alternatively, the NOC material can be made of polypropylene.

The method for secondary-molding the NOC material in accordance with the present invention can be arranged such that the step (2) is fusing a plurality of NOC materials together.

The method for secondary-molding the NOC material in accordance with the present invention can be arranged such that the step (2) is stacking a plurality of sheet-shape NOC materials on top of each other and fusing the plurality of sheet-shape NOC materials.

The method for secondary-molding the NOC material in accordance with the present invention can be arranged such that the step (2) is molding the NOC material by press molding, stretch molding, roll molding, drawing molding, welding molding, fusion molding or vacuum molding.

The present invention also encompasses a secondary-molded object made of an NOC material, which is obtained by the method for secondary-molding the NOC material in accordance with the present invention and is constituted by a plurality of NOC materials fused together.

The secondary-molded object can be a laminate constituted by a stack of a plurality of sheet-shape NOC materials.

The following description provides Examples, to further specifically explain the embodiment of the present invention. It is needless to say that the present invention is not limited these Examples, and details thereof can take various aspects. The present invention is not limited to the description of the embodiment above, but may be altered within the scope of the claims. An embodiment based on a proper combination of technical means disclosed in different embodiments is encompassed in the technical scope of the present invention. Further, all the academic literatures and patent literatures cited in this specification are of assistance as references in this specification.

EXAMPLES

1. NOC Material

[Production of NOC Material]

Used as iPP in production of an NOC material was Adstif HA1152 ($M_w=34\times10^4$, $M_w/M_n=30$, equilibrium melting point $T_m^{\circ}$32 187° C.) manufactured by LyondellBasell Industries or SunAllomer PM802A ($M_w=23\times10^4$, $M_w/M_n=7$, equilibrium melting point $T_m^{\circ}=187°$ C.) manufactured by SunAllomer Ltd. "$M_w$" denotes a weight average molecular weight and "$M_n$" denotes a number average molecular weight. $T_m^{\circ}$ in a certain $M_w$ was assumed as the same as $T_m^0$ of $M_W$ determined in "K. Yamada, M. Hikosaka et al., J. Mac. Sci. Prat B-Physics, B42 (3&4), 733 (2003)".

Figure 3:
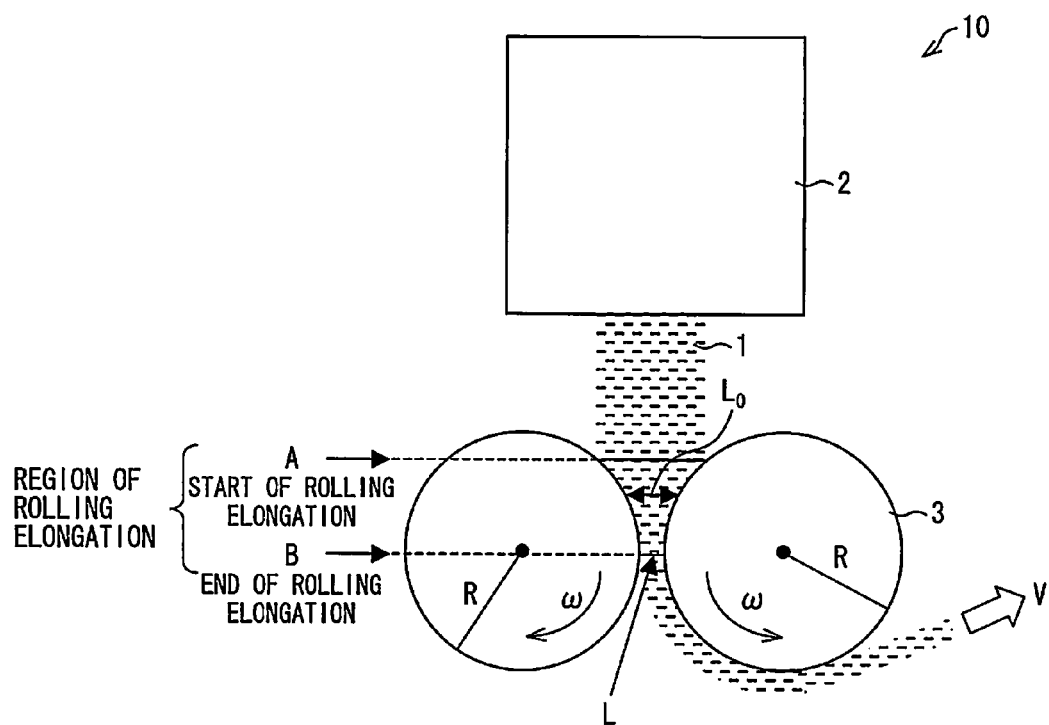
FIG. 3 is a view schematically illustrating a device that was used for producing NOC material in Example.

In a continuously formable apparatus 10 illustrated in FIG. 3, the iPP melt melted at 200° C. was made into a supercooled melt in a temperature range of 120° C. to 150° C., and was extruded out from a slit die of a supercooled melt feeder 2 so as to form a sheet shape. The sheet-shaped iPP supercooled melt was sandwiched between a pair of rotatable sandwiching rollers 3 kept at 140° C. to 150° C., and was elongated by rolling at an elongation strain rate (300 s$^{-1}$) not less than a critical elongation strain rate $\epsilon^*$ (50 s$^{-1}$ for HA1152, 150 s$^{-1}$ for PM802A), to produce an NOC material. The critical elongation strain rates $\epsilon^*$ are determined through previous analyses by the inventors of the present invention.

A sample was cut out as appropriate from the NOC material thus produced, and its physical properties and structure were measured. Note that, although a plurality of NOC materials were produced, the following description discusses only one of the plurality of NOC materials.

[Polarization Microscopy of NOC Material]

A size of the cutout sample in the length and width direction was measured with an optical substance microscope (SZX10-3141; manufactured by Olympus Corporation) using a scale calibrated with an object micrometer. The thickness of the sample was measured with a micrometer or the optical substance microscope (SZX10-3141; manufactured by Olympus Corporation). Measurement of size was carried out at a room temperature of 25° C. The thickness of the sample was 0.2 mm to 0.4 mm.

Microscopic observation was carried out by use of a sample (thickness of 0.25 mm) of the NOC material. The sample was directly observed with a polarization micro system from a direction perpendicular to both directions of MD and TD (Through), and change in pattern and orientation of polymer chains were recorded and measured. The polarizing microscope used was BX51N-33P-OC manufactured by Olympus Corporation, the CCD camera used was the cooled digital camera QICAM manufactured by QImaging, and a personal computer was used for the recording. Further, in order to quantitatively measure retardation changes, a sensitive-tint plate was inserted between a polarizer and an analyzer (polarizing plate) of the polarizing microscope (see H. Awaya, *Kobunshi Sozai no Henko Kenbikyo Nyumon* (Introduction of Polarizing Microscope for Polymer Materials, Agne Gijutsu Center Co., Ltd. 2001, p. 75-103). Observation by the polarizing microscope was carried out at a room temperature of 25° C.

Figure 4:
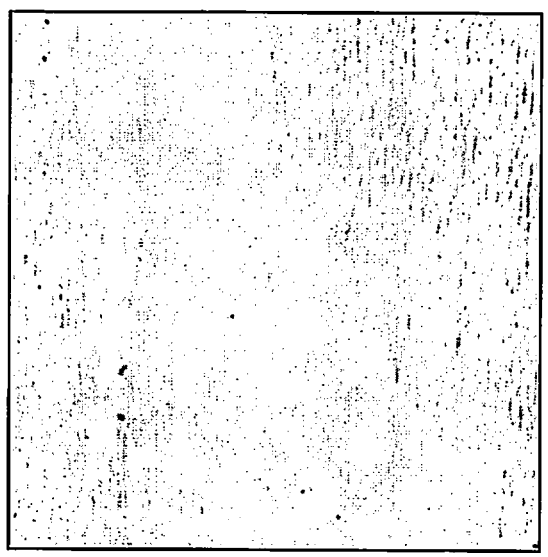
FIG. 4 is a polarization microscopic image of NOC material (thickness of 0.25 mm) used in Example.

A polarization microscopic photograph is shown in FIG. 4. In FIG. 4, no granular spherocrystal was observed, but an extra-fine streaked pattern oriented in the MD direction was observed. The sample was rotated while the sensitive-tint plate was inserted in the polarizing microscope, which showed a color change in the MD direction (namely, retardation) from blue, purplish red, yellow, then purplish red, and further showed a clear extinction angle (purplish red color). Therefore, it was clearly recognized from this change in retardation that the polymer chains were remarkably oriented in the MD direction.

[Measurement of Crystallinity of NOC Material]

Crystallinity $X_c$ of the sample of the NOC material was measured by a density method. More specifically, the crystallinity of the sample was determined by a density method using mass (M) and volume (V). Measurement was carried out at a room temperature of 25° C. The size of the cutout sample was measured using a micrometer and an optical substance microscope (SZX10-3141; manufactured by Olympus Corporation). The mass of the cutout sample was measured with a digital electronic balance (ME253S; manufactured by Sartorius AG). Measurement was carried out at a room temperature of 25° C.

The cutout sample had a length of 3.2 mm, a width of 4.1 mm, and a thickness of 0.26 mm, and its mass was 3.18× 10$^{-3}$ g. Hence, the sample had a density ρ of 0.93 (g/cm$^3$), and the crystallinity $X_c$ calculated by the foregoing formula of crystallinity (Math. 1) was 0.93 (=93%).

[Heat Distortion Temperature Test for NOC Material]

A heat distortion temperature of the NOC material was measured by the test-piece size direct-reading method with use of an optical microscope. A test piece (having a length of 0.7 mm, a width of 0.7 mm, and a thickness of 0.25 mm) was placed on a hot stage (L-600A; manufactured by Linkam Scientific Instruments Ltd.), and a temperature inside the hot stage was risen by a heating rate of 1 K per minute. Meanwhile, the test piece was observed and recorded with the optical microscope having a CCD camera (BX51N-33P-OC; manufactured by Olympus Corporation). The test piece was measured in the length direction (MD) and the width direction (TD) quantitatively with the image-analysis software (Image-Pro PLUS; manufactured by Media Cybernetics, Inc.), and a temperature at a time when the test piece started to contract (or expand) by not less than 3% in the MD direction or TD direction was acquired as the heat distortion temperature $T_d$.

As a result, the heat distortion temperature $T_d$ of the NOC material was 176° C. and a melting point $T_m$ of the NOC material was 178° C.

[Study on Structure of NOC Material]

The NOC material was observed using a small-angle X-ray scattering method (hereinafter, referred to as "SAXS method"). The SAXS method was performed as described in "M. Kakudo and N. Kasai, *Kobunshi Ekkusu-sen Kaisetsu* (Polymer X-ray Diffraction), Maruzen Co., Ltd., 1968" or "T. Masuko, *Kobunshi Ekkusu-sen Kaisetsu* (Polymer X-ray Diffraction), 3.3 ed. Yamagata University Student Cooperative, 1995". More specifically, the SAXS method was carried out with SPring-8, Beam Line BL40B2 run by Japan Synchrotron Radiation Research Institute (JASRI) at a room temperature of 25° C., having an X-ray wavelength λ of 0.15 nm and a camera length of 1654 mm, and using Imaging Plate as a detector. The sample was observed from three directions: a direction perpendicular to both MD and TD (through), a direction parallel to TD (edge), and a direction parallel to MD (end). The MD direction was set as the Z-axis direction for the samples which were observed from through and edge and the TD direction was set as the Z-axis direction for the sample which was observed from end. The exposure time to X-rays was set as 180 seconds. The imaging plate was read by use of a reading apparatus and reading software manufactured by Rigaku Corporation (raxwish, control; Rigaku Corporation), thereby obtaining two-dimensional images thereof.

Figure 5:
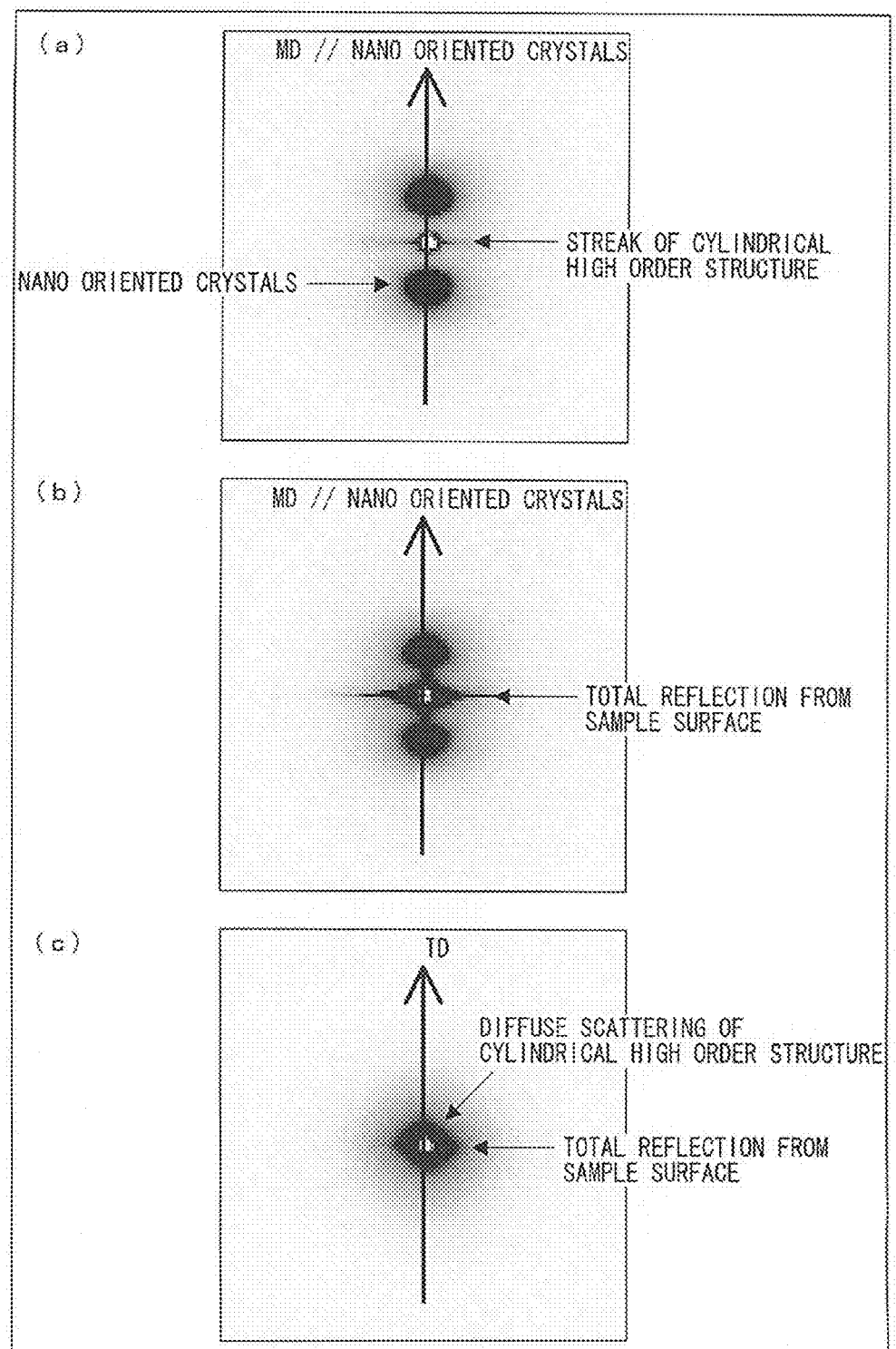
FIG. 5 is a view illustrating two-dimensional scattering patterns obtained by observing, by a small-angle X-ray scattering method, NOC material that was used in Example. (a) of FIG. 5 shows a two-dimensional scattering pattern obtained as a result of exposing NOC material to X-rays from a direction perpendicular to both MD and TD (through), (b) of FIG. 5 shows a two-dimensional scattering pattern obtained as a result of exposing NOC material to X-rays from a direction parallel to TD (edge), and (c) of FIG. 5 shows a two-dimensional scattering pattern obtained as a result of exposing NOC material to X-rays from a direction parallel to MD (end).

FIG. 5 illustrates the two-dimensional images. Illustrated in (a) through and (b) edge are each a two-pointed image in the MD direction, and thus was found that the oriented nano crystals are oriented extremely strongly in the MD direction. Moreover, (a) through showed a streak extending in an equatorial direction from a center thereof, and (c) end showed a nonoriented diffuse scattering dispersion which spreads isotropically from its center. From this fact, it was possible to come to the conclusion that the NOC material thus produced has a cylindrical high order structure (see A.

Guinier, "*Ekkusu-sen Kessyogaku no Riron to Jissai*" (Theory and Practice of X-ray Crystallography), Rigaku Corporation, p. 513, 1967).

Figure 6:
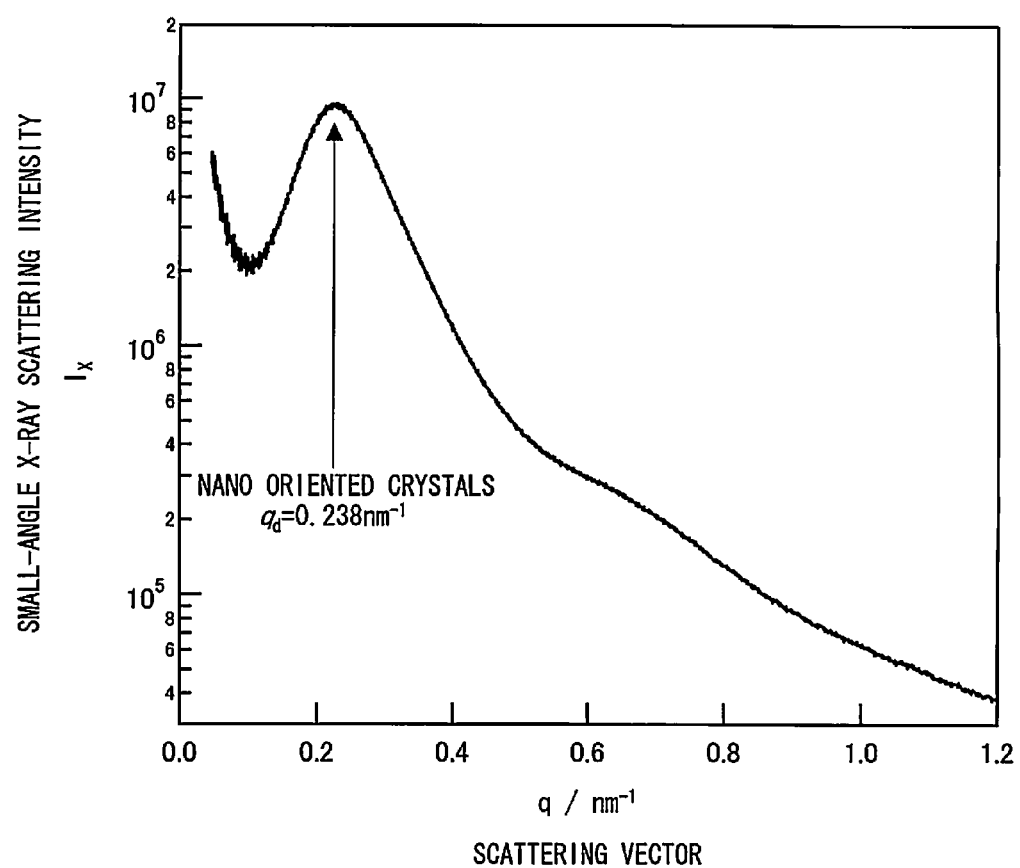
FIG. 6 is a graph illustrating a curve of a small-angle X-ray scattering intensity ($I_x$) against a scattering vector (q), which was obtained on the basis of the two-dimensional scattering pattern of NOC material used in Example. The two-dimensional scattering pattern is obtained by exposing the NOC material to X-rays from a direction perpendicular to both MD and TD (through).

A diameter φ of the cylindrical high order structure was analyzed by analyzing the two-dimensional image of the end shown in (c) of FIG. 5 with analysis software (R-axis, display; Rigaku Corporation). As a result of integrating all angles of deviation in the two-dimensional image excluding total reflection from the sample surface and thereafter carrying out background correction, a curve of a small-angle X-ray diffuse scattering intensity ($I_x$) against a square of a scattering vector ($q^2$) shown in FIG. 6 was obtained. An approximated curve was obtained by the formula of a Guinier plot $I_x=A\exp(-R_g^2 q^2/3)$, and a radius of inertia $R_g=26$ nm was obtained from a slope of the curve. As a result, a diameter φ of the cylindrical high order structure was determined as follows: $2\times\sqrt{(5\div3)}\times R_g=70$ nm.

[Study on Size of NOC of NOC Material]

The two-dimensional image of through shown in (a) of FIG. 5 was analyzed using analysis software (R-axis, display; Rigaku Corporation). A curve of a small-angle X-ray scattering intensity (1×) against a scattering vector (q) shown in FIG. 6 was obtained by integrating angles of deviation all around the two-dimensional image and thereafter carrying out background correction. A scattering vector q corresponding to a primary peak in the $I_x$ curve is $q_d$, which showed a value of 0.238 nm$^{-1}$. Accordingly, the size d of the NOC was $2\pi/q_d=26$ nm.

[Measurement of $\alpha_2$ Fraction of NOC Material]

The NOC material thus produced was observed by the wide-angle X-ray scattering method (WAXS method) from the three directions of through, edge, and end. The WAXS method was carried out with SPring-8, Beam Line BL40B2 of Japan Synchrotron Radiation Research Institute (JASRI) at a room temperature of 25° C., using an Imaging Plate as a detector, and having a wavelength (λ) of the X-ray be set as 0.072 nm and a camera length (R) be set as 270 mm. The MD direction was set as the Z-axis direction for the samples which were observed from the through and edge, and the TD direction was set as the Z-axis direction for the sample which was observed from the end. The exposure time to X-rays was set as 60 seconds. The imaging plate was read out by a reading apparatus and reading software (raxwish, control; Rigaku Corporation) manufactured by Rigaku Corporation, thus obtaining two-dimensional images thereof. Further, the two-dimensional image was analyzed using analysis software (R-axis, display; Rigaku Corporation), to measure a volume fraction $f(\alpha_2)$ of $\alpha_2$ phase. More specifically, an $\alpha_2$ fraction was calculated by the following formula:

(Formula)

$$f(\alpha_2) = \frac{|F_0|}{|F_{\alpha_2}|} \quad [\text{Math. 3}]$$

for hk1=−2, 3, 1 and −1, 6, 1 (see M. Hikosaka, Polymer Journal, 1973, 5, p. 124). Here, $|F_0|$ is a structure factor obtained from observation of hk1=−2, 3, 1, and −1, 6, 1, $|F\alpha_2|$ is a structure factor of hk1=−2, 3, 1, and −1, 6, 1 at a time when it is 100% $\alpha_2$ phase. The $|F_0|$ satisfies a relationship with the wide-angle X-ray scattering intensity (1×) obtained upon correcting the background, as in the following formula:

$$I_x=|F_0|^2 \quad \text{(Formula)}$$

Figure 7:
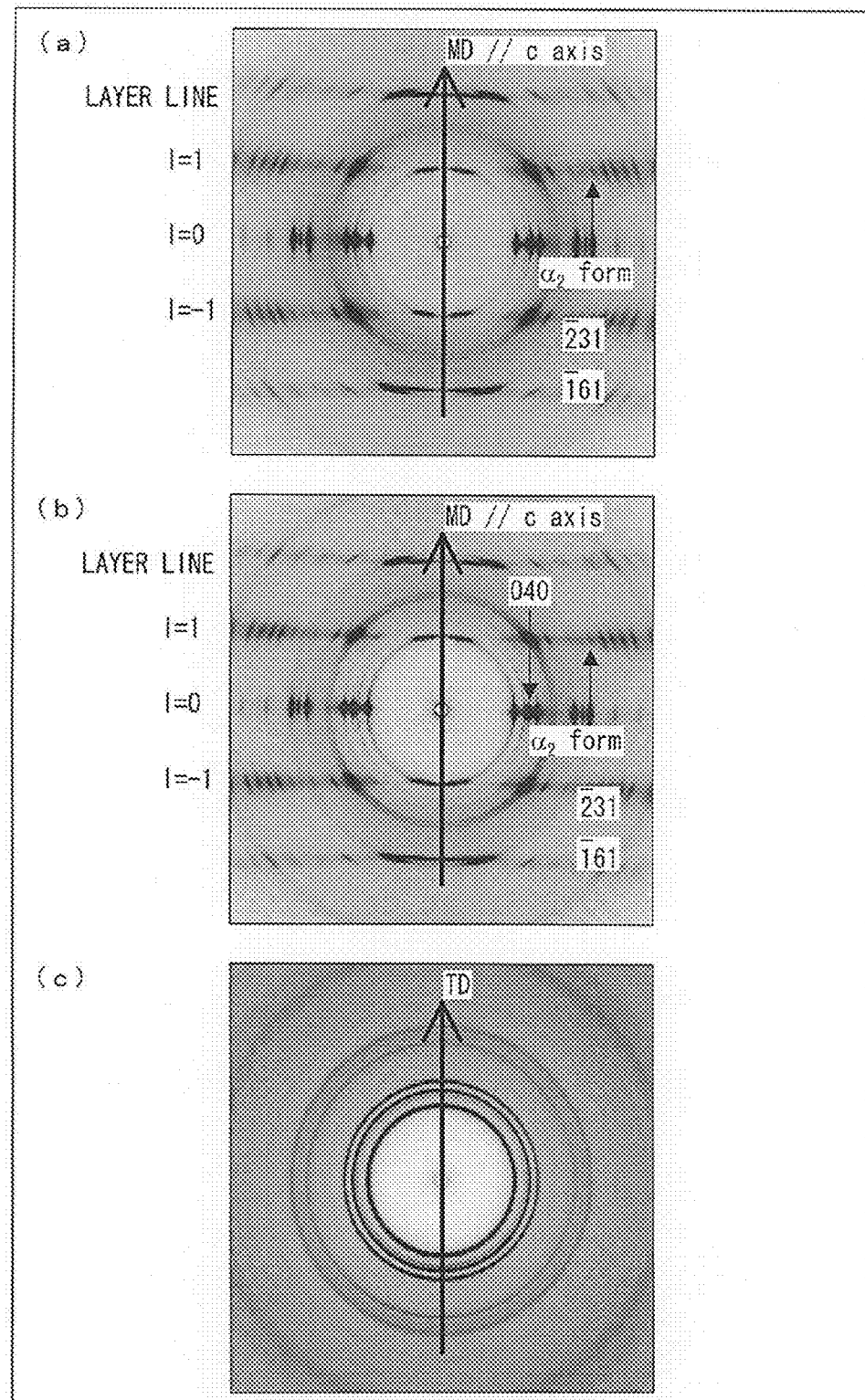
FIG. 7 shows two-dimensional scattering patterns obtained by observing, by a wide-angle X-ray scattering method, NOC material that was used in Example. (a) of FIG. 7 shows a two-dimensional scattering pattern obtained as a result of exposing NOC material to X-rays from a direction perpendicular to both MD and TD (through), (b) of FIG. 7 shows a two-dimensional scattering pattern obtained as a result of exposing NOC material to X-rays from a direction parallel to TD (edge), and (c) of FIG. 7 shows a two-dimensional scattering pattern obtained as a result of exposing NOC material to X-rays from a direction parallel to MD (end).

FIG. 7 illustrates a result of the two-dimensional images. The two-dimensional images of (a) through and (b) edge show that the crystal structure is of the $\alpha_2$ phase, since hk1=−2,3,1, and −1,6,1 reflection appeared. (See M. Hikosaka, Polymer Journal, 1973, 5, p. 111-127). The $\alpha_2$ fraction $f(\alpha_2)$ was 0.8.

[Measurement of Orientation Function $f_c$ of NOC Material]

An orientation function $f_c$ of the NOC material was obtained from the two-dimensional image obtained above. More specifically, orientation function $f_c$ was obtained by analyzing the two-dimensional image illustrated in (b) of FIG. 7 (edge) obtained by the imaging plate reading software (raxwish, control; Rigaku International Corporation), by analyzing with a spreadsheet software (Igor Pro; manufactured by WaveMetrics). As to hk1=040 reflection shown in (b) of FIG. 7, the curve of wide angle X-ray scattering intensity ($I_x$) against angle of deviation (β) was obtained by carrying out background correction. More specifically, a formula of the orientation function is as follows:

$$f_c = <3\cos^2\beta - 1> \div 2.$$

Note, however, that the following formula:

(Formula)

$$\langle 3\cos^2\beta - 1 \rangle = \frac{\int_0^{2\pi} (3\cos^2\beta - 1) I_X(\beta) d\beta}{\int_0^{2\pi} I_X(\beta) d\beta} \quad [\text{Math. 4}]$$

is used to calculate $f_c$.

It was revealed that the molecule chain (c axis) is oriented extremely strongly in the MD direction in the (a) through and (b) edge of FIG. 7. Since (c) end corresponded to the equatorial plane of 1=0 of through, this was nonoriented. The oriented function of $f_c=0.92$ was obtained in accordance with the hk1=040 reflection of (b) edge.

[Mechanical Property Test for NOC Material]

Tensile strength of the NOC material thus produced was measured in conformity with JIS K7127. More specifically, a test piece (gauge length of 7 mm, width of narrow parallel part of 1.6 mm, and thickness of 0.25 mm) was set in the precision universal tester (Autograph AG-1kNIS; manufactured by Shimadzu Corporation), to measure tensile strength by pulling the test piece at a tensile rate of 10 mm/min. Measurement was carried out at a room temperature of 25° C.

Furthermore, tensile modulus was measured in conformity with the method described in JIS K7161. The measurement was carried out at room temperature (25° C.).

As a result of measuring the tensile strength and the tensile modulus of the NOC material, the tensile strength was $\sigma_y=0.21$ GPa and the tensile modulus was E=4.1 GPa.

[Transparency Test for NOC Material]

The haze (haze value: thickness of 0.3 mm) of the NOC material was measured by a haze measuring method. The haze measuring method was carried out by measuring the amount of light transmitted through the test piece. An apparatus including an optical microscope (BX51N-33P-OC; manufactured by Olympus Corporation), a CCD camera (cooled digital camera QICAM; manufactured by QImaging) capable of determining the amount of light, and an image-analysis software (Image-Pro PLUS; manufactured by Media Cybernetics, Inc.) was used in the haze measuring method. A halogen lamp was used as a white light source, to use as measuring light. The size of incident light of this measuring light was of a round shape having a diameter of 1 mm.

As a result, the haze (haze value, thickness of 0.3 mm) of the NOC material was 0.9%.

2. Reproduction Test of NOC Material and Secondary-Molding Test

An NOC material having a room temperature (25° C.) was heated to 135° C., 165° C., 180° C., 210° C., or 225° C. Note that the NOC material in the present example has $T_{o-m}$ of approximately 157° C., $T_m$ of approximately 170° C., and $T_{iso}$ of approximately 215° C. Therefore, the NOC material maintains an ordered phase ($\alpha_2$ phase) at 135° C., is in a mobile phase ($\alpha_2'$ phase) at 165° C., is a DEN melt at 175° C. and 210° C., and is an equilibrium melt at 225° C.

All samples of the NOC material, which were heated to the respective temperatures, were allowed to cool to room temperature.

The samples that had not been heated yet, the samples that were heated, and the samples after cooling were analyzed by a WAXS method and a SAXS method. Details of the WAXS and SAXS methods have been already described earlier.

Figure 8:
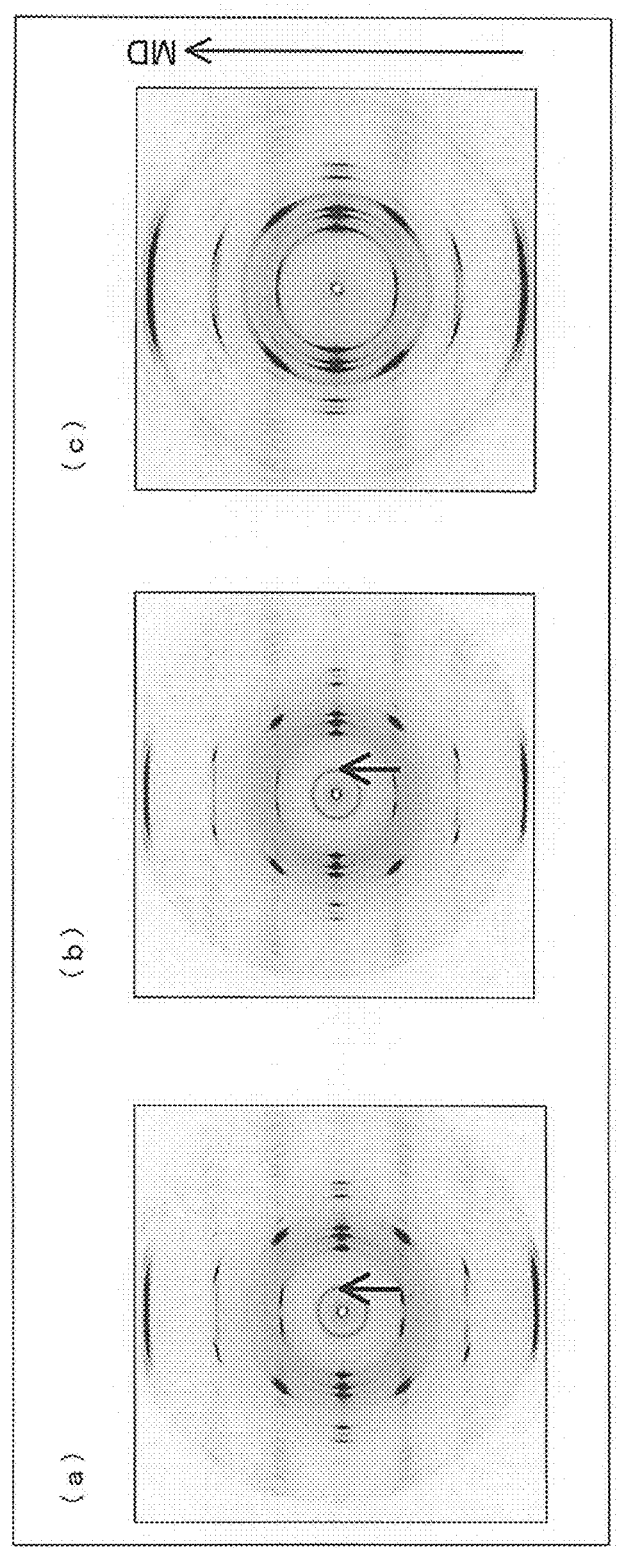
FIG. 8 shows two-dimensional scattering patterns of a sample whose temperature was changed from room temperature to 135° C., and then back to room temperature, which two-dimensional scattering patterns were obtained by a WAXS method. (a) of FIG. 8 shows a two-dimensional scattering pattern obtained from the sample that had not been heated yet, (b) of FIG. 8 shows a two-dimensional scattering pattern obtained from the sample that was heated, and (c) of FIG. 8 shows a two-dimensional scattering pattern obtained from the sample that was allowed to cool under restrained condition.
Figure 9:
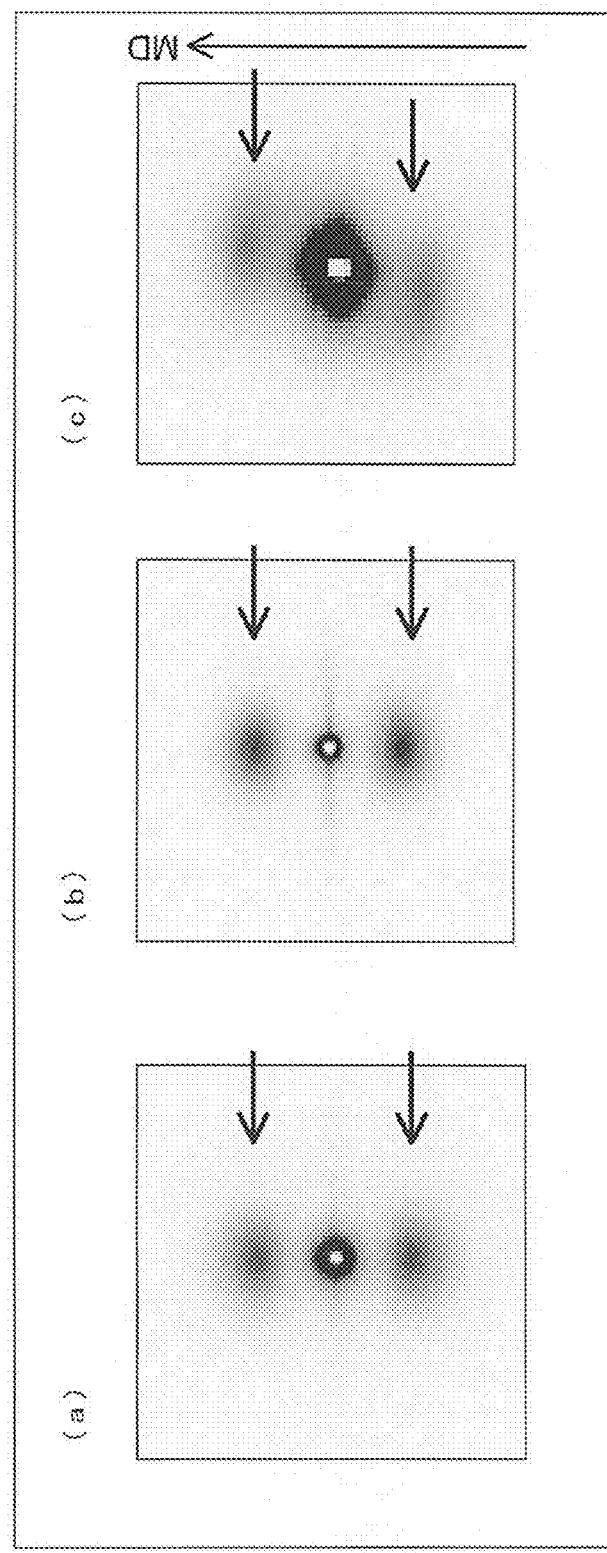
FIG. 9 shows two-dimensional scattering patterns of a sample whose temperature was changed from room temperature to 135° C., and then back to room temperature, which two-dimensional scattering patterns were obtained by a SAXS method. (a) of FIG. 9 shows a two-dimensional scattering pattern obtained from a sample that had not been heated yet, (b) of FIG. 9 shows a two-dimensional scattering pattern obtained from the sample that was heated, and (c) of FIG. 9 shows a two-dimensional scattering pattern obtained from the sample that was allowed to cool under restrained condition.

Each of FIGS. 8 and 9 shows two-dimensional scattering patterns of a sample whose temperature was changed from room temperature to 135° C., and then back to room temperature, which two-dimensional scattering patterns in FIG. 8 were obtained by a WAXS method and which two-dimensional scattering patterns in FIG. 9 were obtained by a SAXS method. In each of FIGS. 8 and 9, (a) shows a two-dimensional scattering pattern obtained from the sample that had not been heated yet, (b) shows a two-dimensional scattering pattern obtained from the sample that was heated, and (c) shows a two-dimensional scattering pattern obtained from the sample that was allowed to cool under tension of 60 MPa. MD in each of FIGS. 8 and 9 indicates a tensile direction (the same applies to the following similar drawings). Note that scattering indicated by an arrow in FIG. 8 is derived from kapton.

Although a plasticity failure of NOCs was partially found in the sample illustrated in (c) of FIGS. 8 and 9, the pattern indicating that the sample was an NOC material was observed in each sample. Particularly, two-pointed images in SAXS images of FIG. 9 (see arrows in FIG. 9) are typical patterns indicating that the samples were NOC materials. Because the samples maintain the ordered phase at 135° C., the samples, whose temperature was changed from room temperature, 135° C., and then to room temperature, showed a WAXS pattern or a SAXS pattern indicating that the samples were NOC materials.

Figure 10:
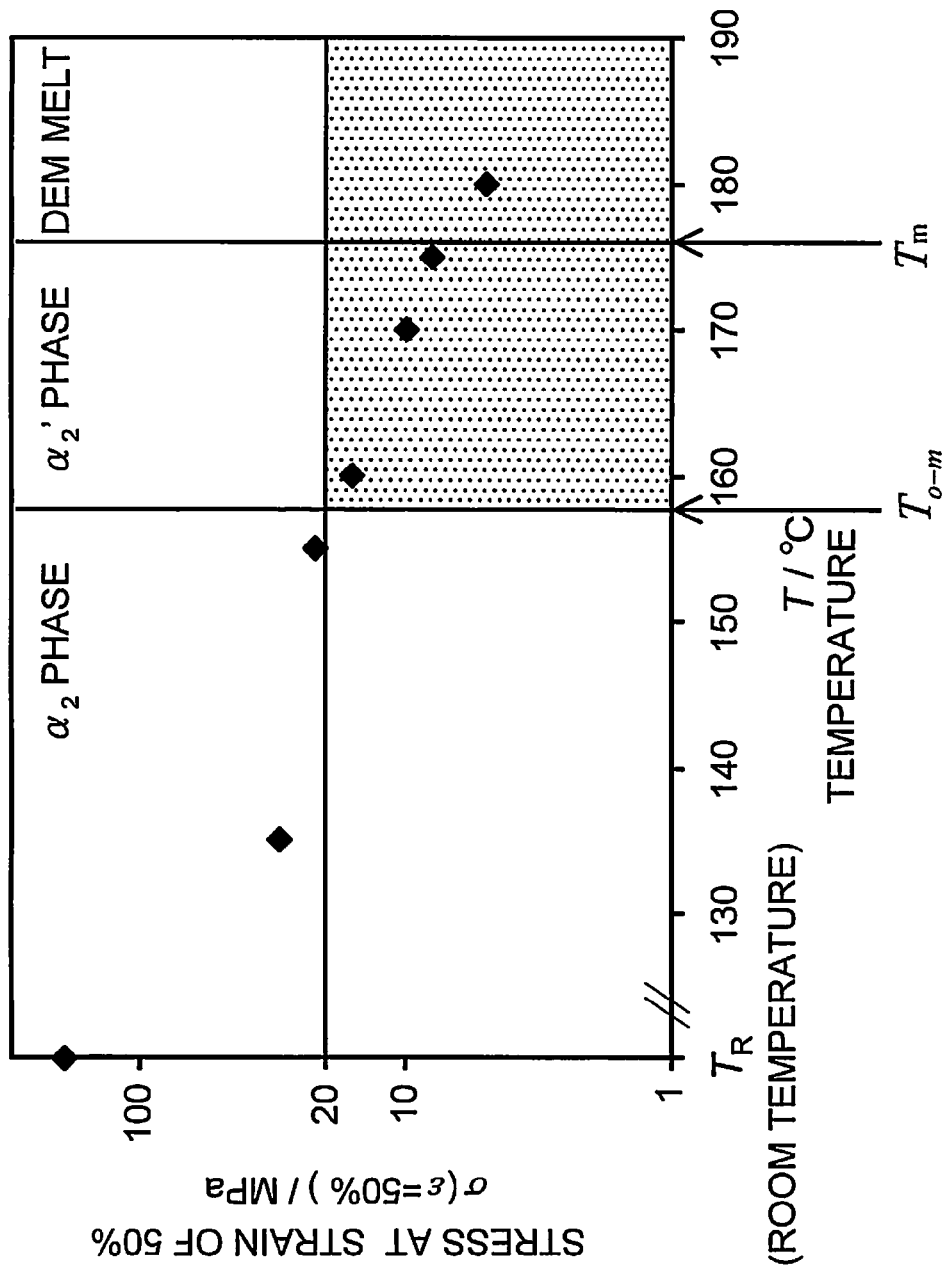
FIG. 10 is a view showing a stress σ, of NOC material used in the present Example, at strain of 50% (E=50%) at various temperatures.

Note that the sample that was heated to 135° C. did not have enough flexibility to be secondary-molded. Here, whether or not a sample can be secondary-molded can be determined on the basis of a stress σ of the NOC material at strain of 50% (ε=50%). Generally, it is possible to determine that the sample can be secondary-molded if a stress σ (ε=50%) of the sample at strain of 50% is 20 MPa or less. FIG. 10 shows a result of measurement of a stress σ, of the NOC material used in the present Example, at strain of 50% (ε=50%) at each temperature. According to FIG. 10, it is found that the sample in the ordered phase ($\alpha_2$ phase) is not suitable for secondary-molding because the stress σ (ε=50%) at strain of 50% excesses 20 MPa. If the sample in the ordered phase is forcibly subjected to secondary-molding, the sample is physically destroyed (for example, see (c) of FIG. 9). Meanwhile, stresses σ (ε=50%) at strain of 50% of the sample in a mobile phase ($\alpha_2'$ phase) and of the sample in the form of a DEN melt are 20 MPa or less, so that the samples can be secondary-molded.

Figure 11:
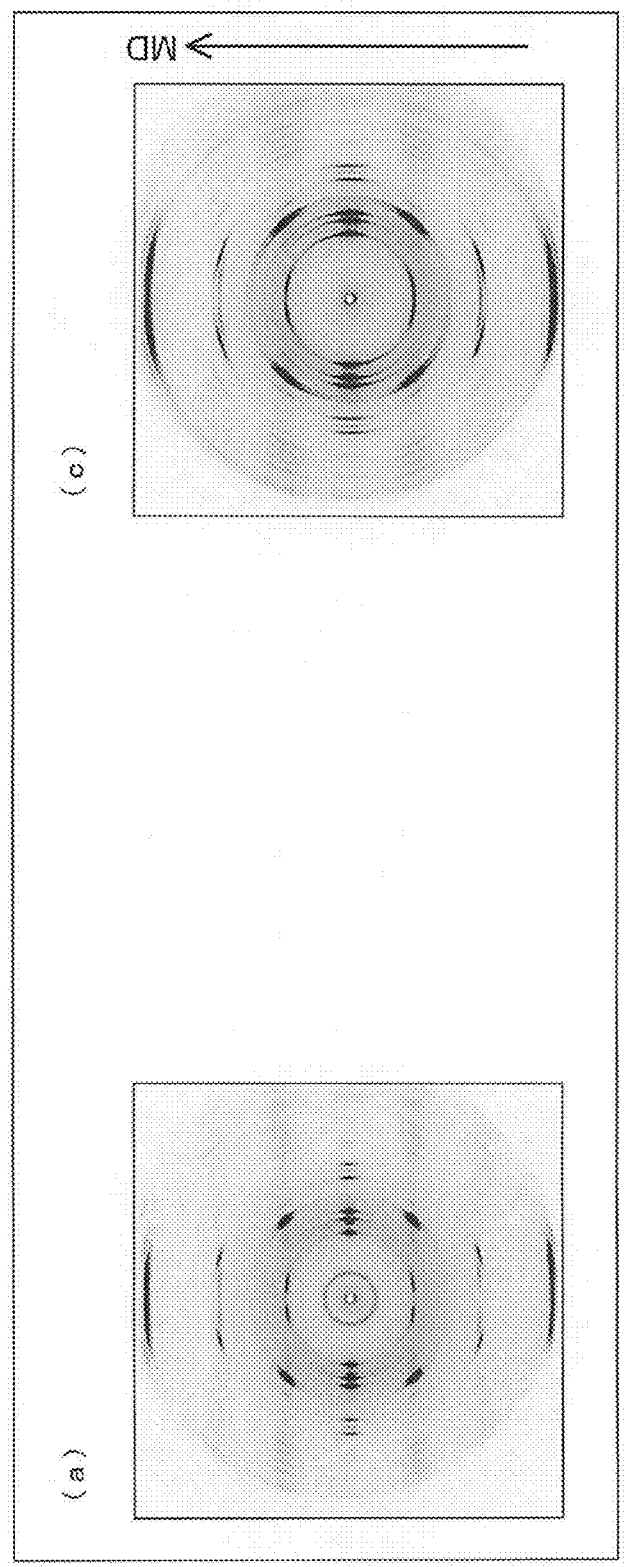
FIG. 11 shows two-dimensional scattering patterns of a sample whose temperature was changed from room temperature to 165° C., and then back to room temperature, which two-dimensional scattering patterns were obtained by a WAXS method. (a) of FIG. 11 shows a two-dimensional scattering pattern obtained from a sample that had not been heated yet, and (c) of FIG. 11 shows a two-dimensional scattering pattern obtained from the sample that was allowed to cool under restrained condition.
Figure 12:
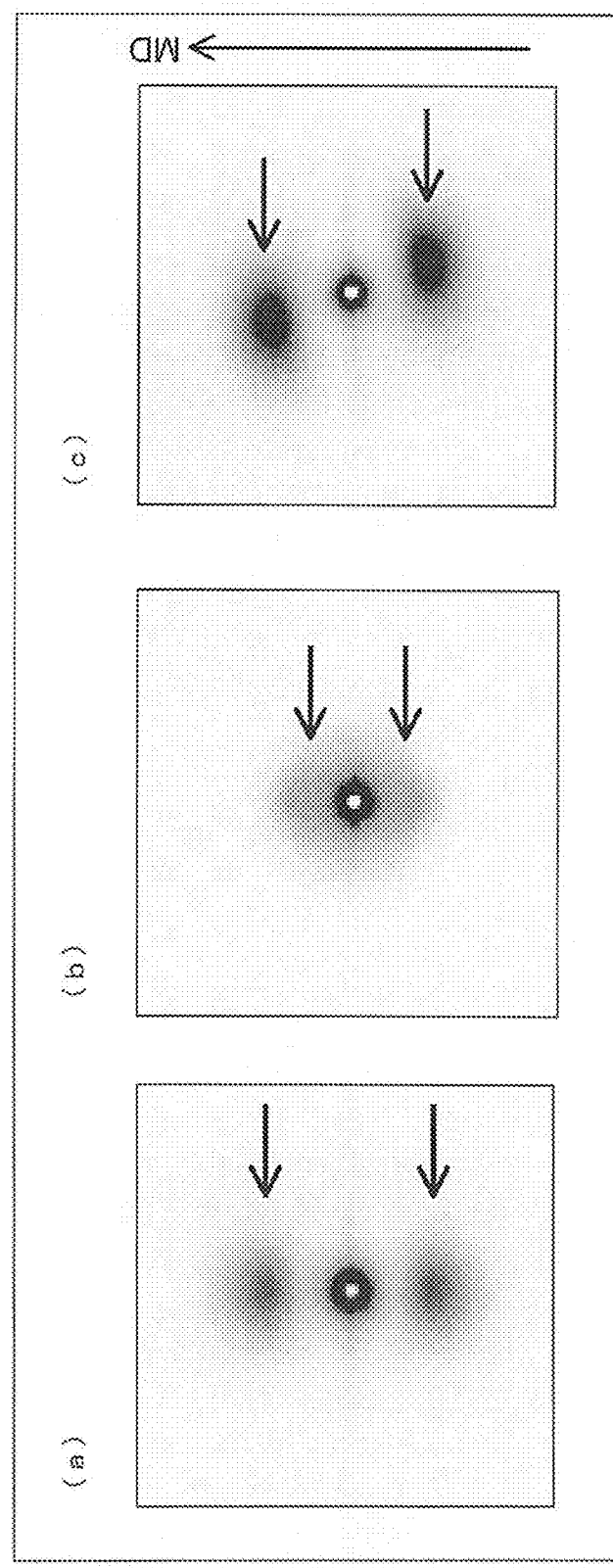
FIG. 12 shows two-dimensional scattering patterns of a sample (as an example) whose temperature was changed from room temperature to 165° C., and then back to room temperature, which two-dimensional scattering patterns were obtained by a SAXS method. (a) of FIG. 12 shows a two-dimensional scattering pattern obtained from a sample that had not been heated yet, (b) of FIG. 12 shows a two-dimensional scattering pattern obtained from the sample that was heated, and (c) of FIG. 12 shows a two-dimensional scattering pattern obtained from the sample that was allowed to cool under restrained condition.

Each of FIGS. 11 and 12 shows two-dimensional scattering patterns of a sample whose temperature was changed from room temperature to 165° C., and then back to room temperature, which two-dimensional scattering patterns in FIG. 11 were obtained by a WAXS method and which two-dimensional scattering patterns in FIG. 12 were obtained by a SAXS method. (a) of FIG. 11 shows a two-dimensional scattering pattern obtained from the sample that had not been heated yet, and (c) of FIG. 11 shows a two-dimensional scattering pattern obtained from the sample that was allowed to cool under tension of 50 MPa. Further, in FIG. 12, (a) shows a two-dimensional scattering pattern obtained from the sample that had not been heated yet, (b) shows a two-dimensional scattering pattern obtained from the sample that was heated, and (c) shows a two-dimensional scattering pattern obtained from a heated sample that was allowed to cool under tension of 50 MPa.

In FIGS. 11 and 12, there were observed patterns indicating that all the samples were NOC materials (particularly, see two-pointed images indicated by arrows in FIG. 12). In (b) of FIG. 12, density fluctuation became small and scattering intensity was reduced because of influence of thermal expansion, however, the two-pointed image indicating that the sample was an NOC material was observed. Based on the scattering pattern illustrated in (b) of FIG. 12, it was confirmed that the sample underwent transition to the mobile phase ($\alpha_2'$ phase). Note that (b) of FIG. 11 does not exist because taking a WAXS image of the sample that was heated was just omitted.

Figure 13:
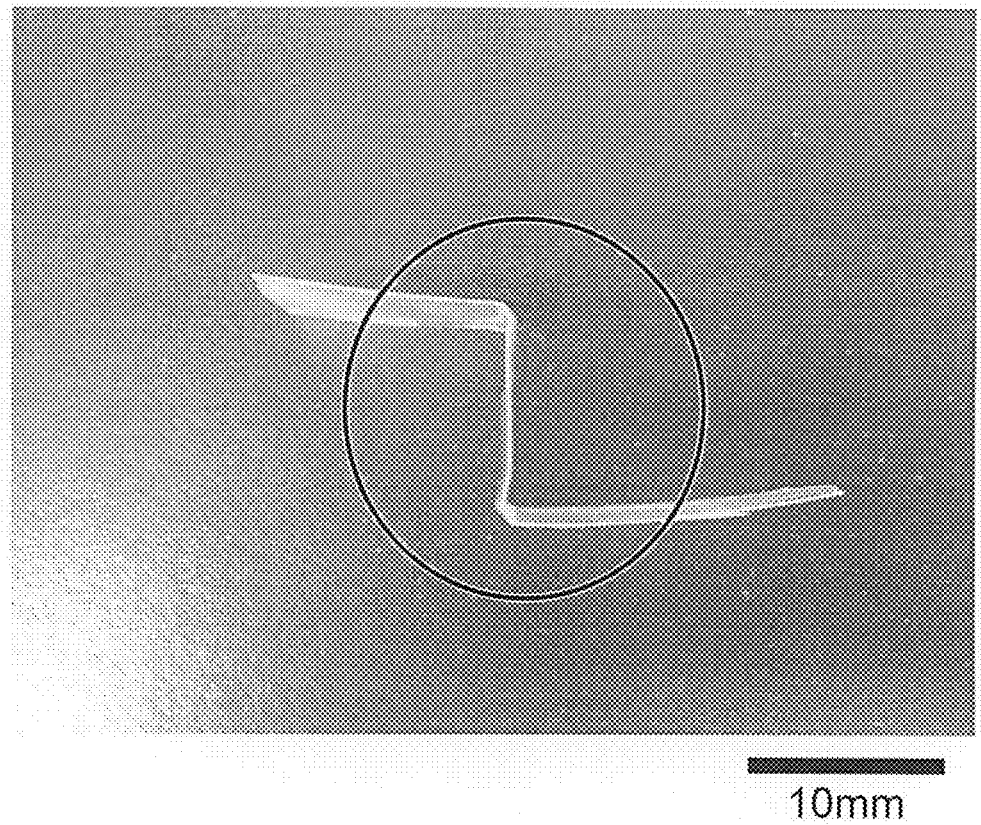
FIG. 13 shows a photograph of a secondary-molded object obtained by heating a sample to 165° C. and secondary-molding the sample.

The sample that was heated to 165° C. had enough flexibility to be secondary-molded (see FIG. 10). The sample that was heated to 165° C. was subjected to deformation by pressing the sample with a pressure of 50 MPa. As a result, a molded object (secondary-molded NOC object) having a crank shape shown in FIG. 13 was obtained.

Figure 14:
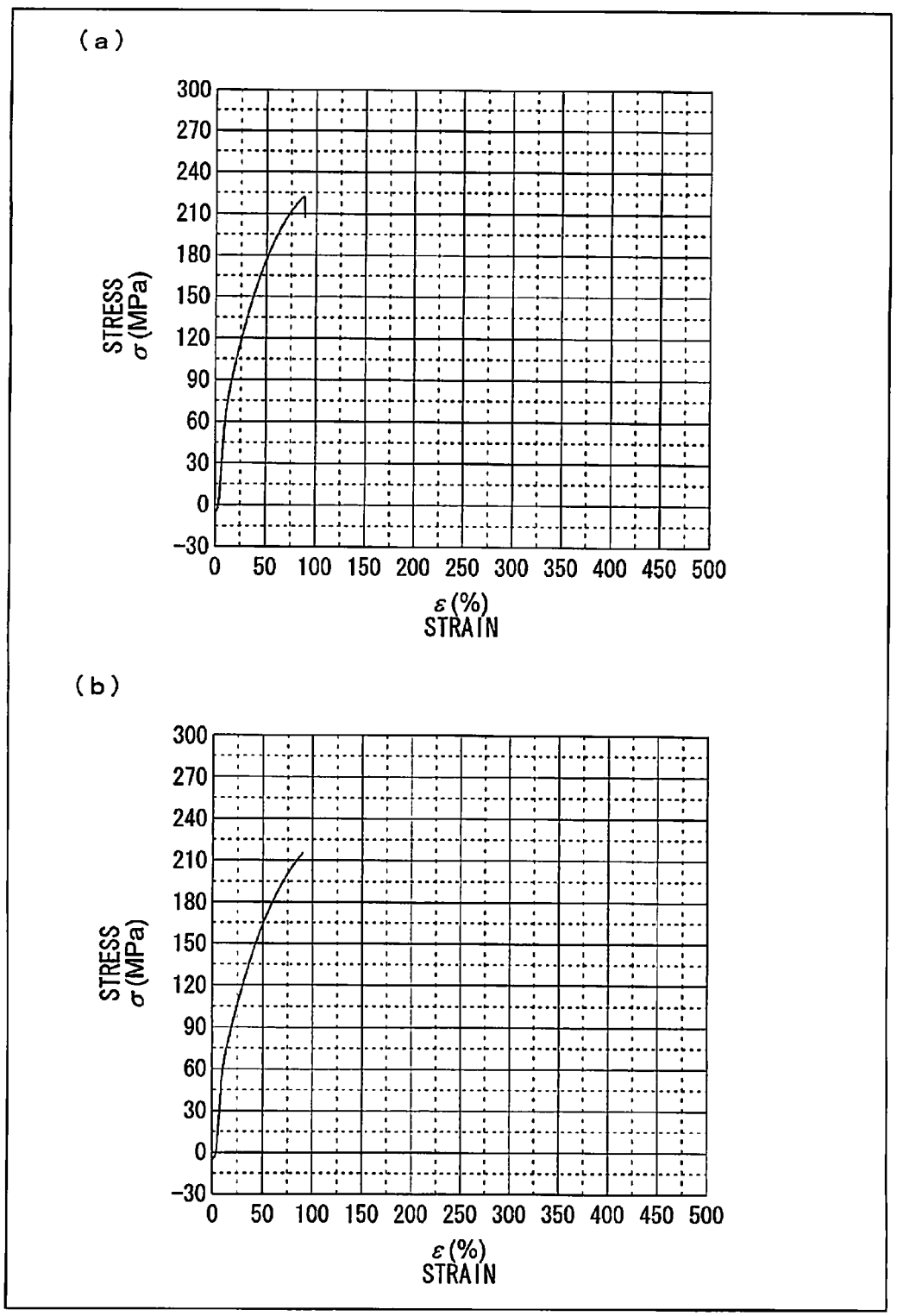
FIG. 14 shows results of measurement of a tensile strength of a sample that had not been heated yet and a tensile strength of the sample that was heated to 165° C. and then allowed to cool under restrained condition. (a) of FIG. 14 shows the result of measurement of the sample that had not been heated yet, whereas (b) of FIG. 14 shows the result of measurement of the sample treated with the cooling.

FIG. 14 shows results of measurement of a tensile strength of a sample that had not been heated yet and a tensile strength of a sample that was heated and then allowed to cool under tension. (a) of FIG. 14 shows the result of measurement of a sample that had not been heated yet, (b) of FIG. 14 shows the result of measurement of a sample that was heated and allowed to cool under tension. According to FIG. 14, there was no difference in tensile strength between the sample that had not been heated yet and the sample that was heated and allowed to cool under tension, and it was found that there was no reduction in tensile strength of a secondary-molded NOC object that was produced by a secondary-molding method of the present invention.

From those results, it is found that it is possible to produce a secondary-molded NOC object by secondary-molding a sample in a mobile phase ($\alpha_2'$ phase) and then allowing the sample to cool.

Figure 15:
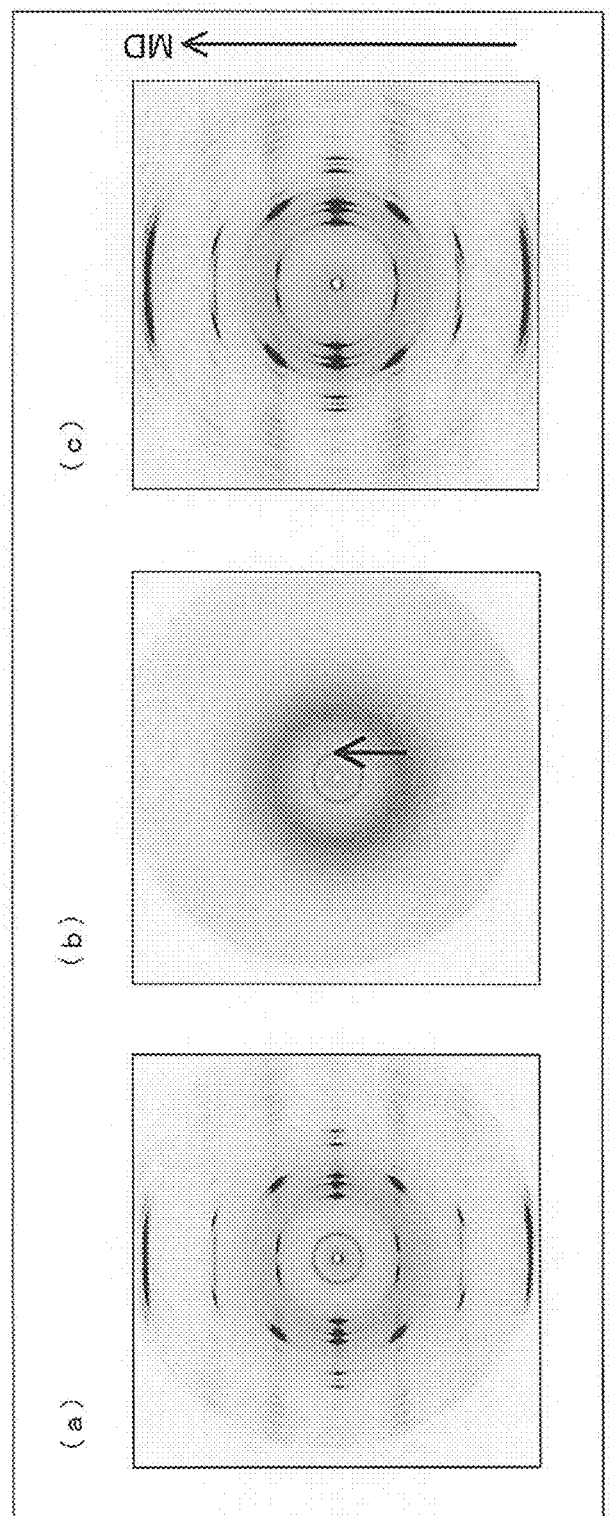
FIG. 15 shows two-dimensional scattering patterns of a sample whose temperature was changed from room temperature to 175° C., and then back to room temperature, which two-dimensional scattering patterns were obtained by a WAXS method. (a) of FIG. 15 shows a two-dimensional scattering pattern obtained from a sample that had not been heated yet, (b) of FIG. 15 shows a two-dimensional scattering pattern obtained from the sample that was heated, and (c) of FIG. 15 shows a two-dimensional scattering pattern obtained from the sample that was allowed to cool under restrained condition.
Figure 16:
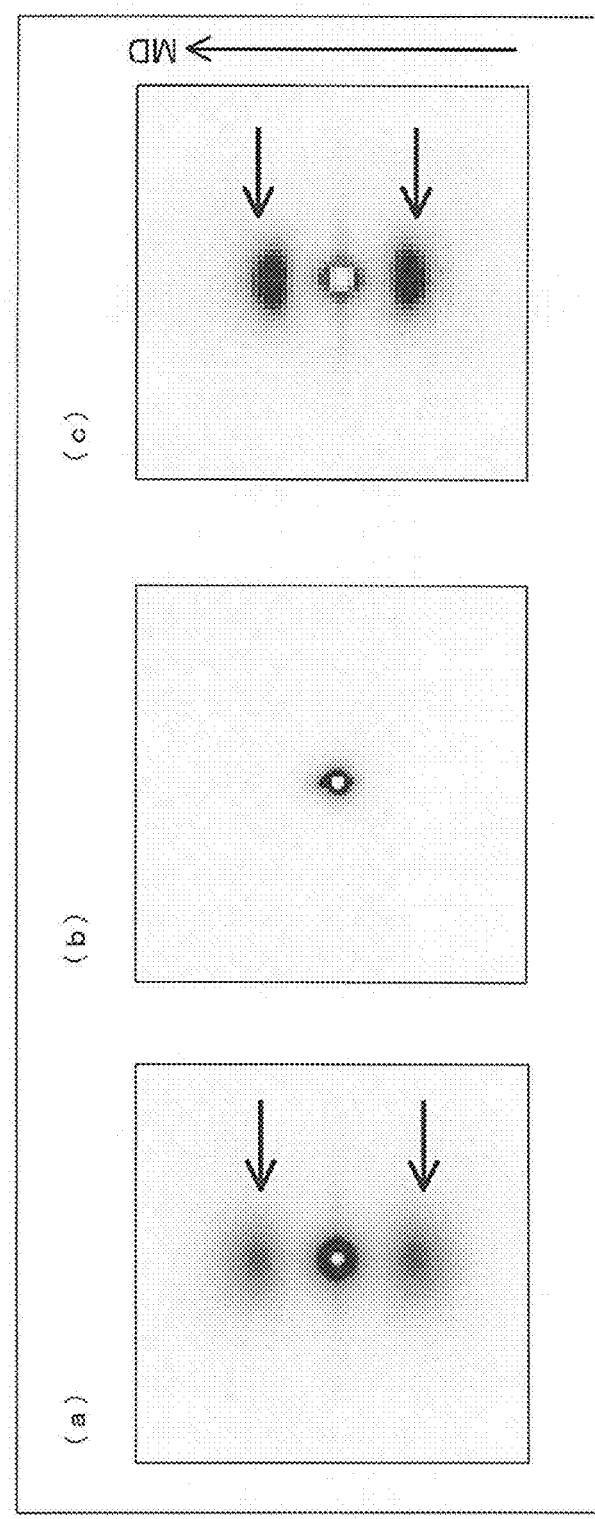
FIG. 16 shows two-dimensional scattering patterns of a sample whose temperature was changed from room temperature to 175° C., and then back to room temperature, which two-dimensional scattering patterns were obtained by a SAXS method. (a) of FIG. 16 shows a two-dimensional scattering pattern obtained from a sample that had not been heated yet, (b) of FIG. 16 shows a two-dimensional scattering pattern obtained from a sample that was heated, and (c) of FIG. 16 shows a two-dimensional scattering pattern obtained from a sample that was allowed to cool under restrained condition.

Each of FIGS. 15 and 16 shows two-dimensional scattering patterns of a sample whose temperature was changed from room temperature to 180° C., and then back to room temperature, which two-dimensional scattering patterns in FIG. 15 were obtained by a WAXS method and which two-dimensional scattering patterns in FIG. 16 were obtained by a SAXS method. In each of FIGS. 15 and 16, (a) shows a two-dimensional scattering pattern obtained from the sample that had not been heated yet, (b) shows a two-dimensional scattering pattern obtained from the sample that was heated, and (c) shows a two-dimensional scattering pattern obtained from the sample that was allowed to cool under tension of 10 MPa. Note that scattering indicated by an arrow in FIG. 15 is derived from kapton.

FIGS. 15 and 16 show patterns indicating that the samples that had not been heated yet and after cooling were NOC materials (particularly, see two-pointed images indicated by arrows in (a) and (c) of FIG. 16). Meanwhile, there was found a pattern indicating that the sample that was heated was not an NOC material. It is clear that, particularly as illustrated in (b) of FIG. 16, NOCs were melted because the two-pointed image disappeared. This result indicates that the sample, which became a non-NOC material because of heating, changed back into the NOC material when the temperature was reduced to room temperature. Note that the sample that was heated to 180° C. has enough flexibility to be secondary-molded (see FIG. 10). In order to deform the sample that was heated to 180° C., the sample was pressed with a pressure of 50 MPa. As a result, a molded object (secondary-molded NOC object) having a crank shape shown in FIG. 21 was obtained.

Figure 17:
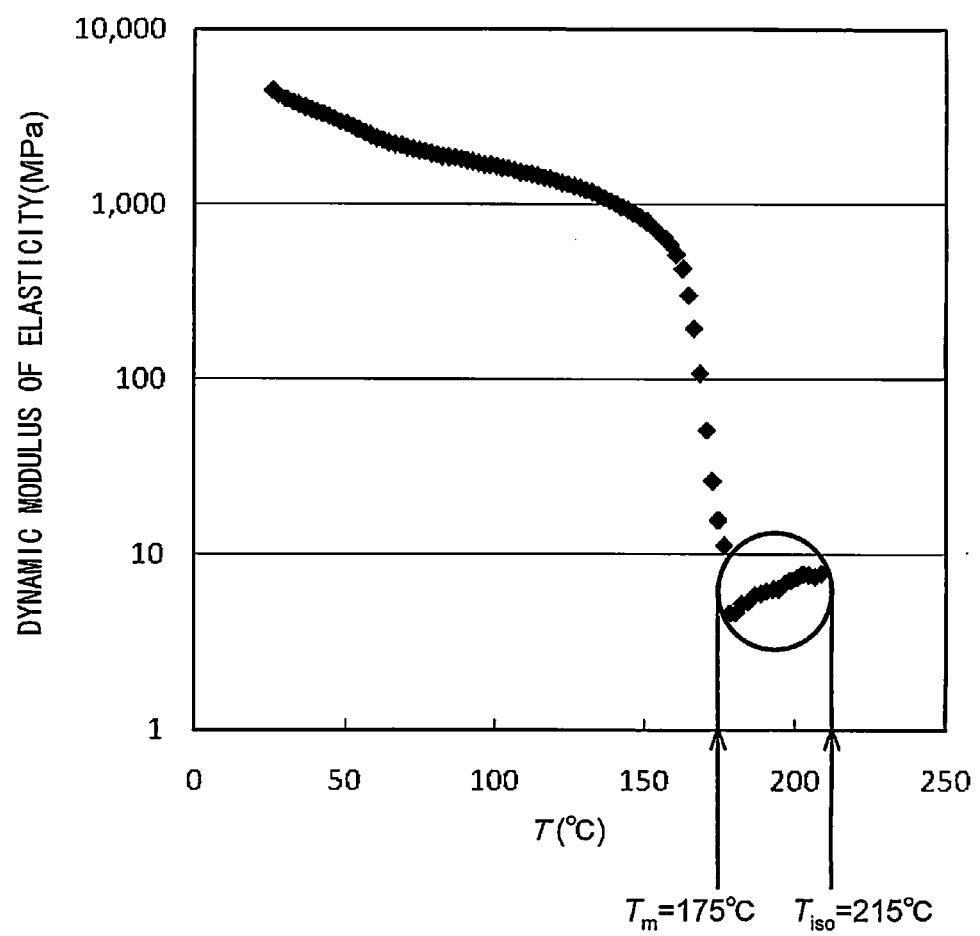
FIG. 17 shows a result of measurement of a dynamic modulus of elasticity in a case where NOC material was heated.
Figure 18:
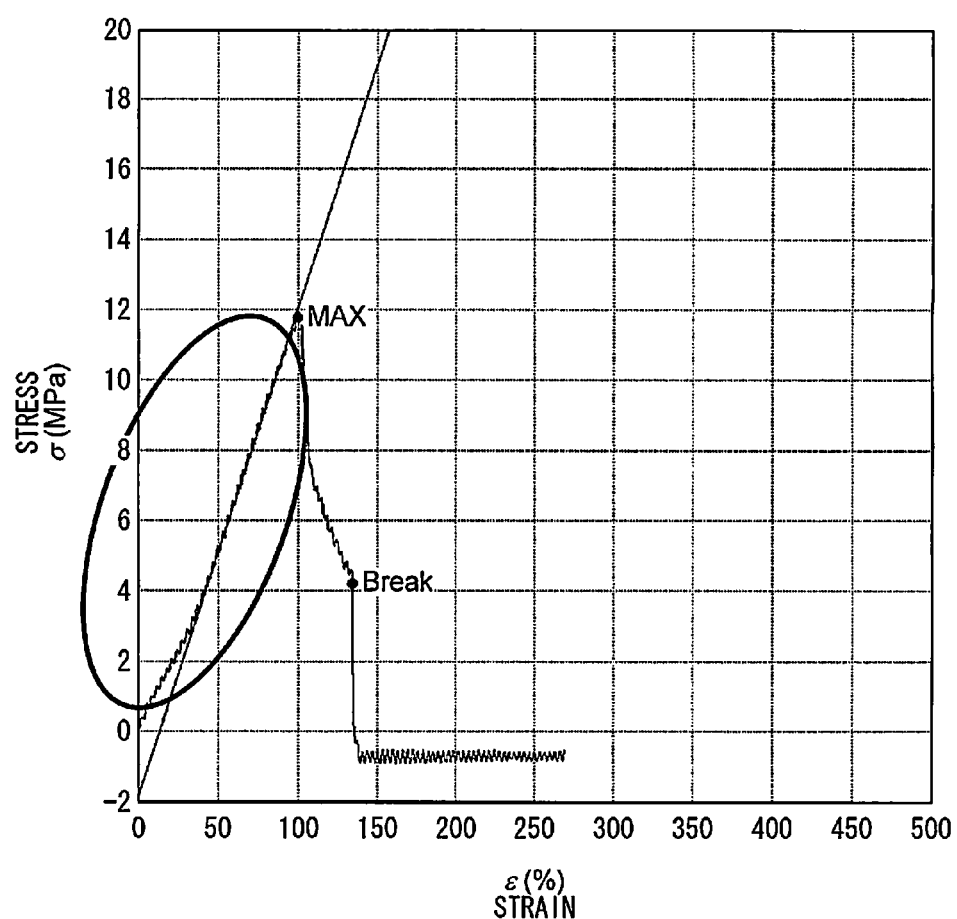
FIG. 18 shows a result of a tensile test of NOC material heated to 180° C.

FIG. 17 shows a result of measurement of a dynamic modulus of elasticity obtained when an NOC material was heated. As an NOC material is heated, a dynamic modulus of elasticity decreases. However, there is a temperature range (175° C. to 215° C.) where the dynamic modulus of elasticity increases, which range starts from a melting point ($T_m$=175° C.) (see a part surrounded by a circle in FIG. 17). A sample (180° C.) in the temperature range was subjected to a tensile test, and a result of the tensile test showed that the sample had enough elasticity (see FIG. 18). A sample having a melting point or more became a melt in a thermal equilibrium state (referred to as an "equilibrium melt"), that is, the sample became liquid. Therefore, the sample does not have elasticity, so that it is impossible to cause the sample to be subjected to a tensile test in the first place. A sample that was heated to 175° C. to 215° C., however, had enough elasticity as shown in FIG. 18. The inventors of the present invention newly found that, from results shown in FIG. 16, FIG. 17, and FIG. 18, there exists a new state called "dense entanglement network-melt: a DEN melt" in which, in a case where a crystalline portion (NOCs) in an entanglement network structure in an ordered phase or a mobile phase undergoes transition to an equilibrium melt, the entanglement network structure is maintained while the crystalline portion (NOCs) in the entanglement network structure is melted. This is a new knowledge the inventors of the present invention found out. Note that, when the temperature of the sample excesses 215° C. (called "$T_{iso}$"), the sample changes into an equilibrium melt (isotropic melt). The equilibrium melt indicates such a melt that a dense entanglement network structure is completely broken and its polymer chains are disoriented.

End surfaces of two sheet-shape NOC materials were contacted with each other in a mold and were heated at 185° C. to thereby be fused with each other, and after that, were allowed to cool to room temperature. FIG. 19 shows a polarization microscopic photograph of a fused part of the NOC materials, a SAXS image of the fused part, and a WAXS image of the fused part. (a) of FIG. 19 shows a polarization microscopic photograph of fused NOC materials (piece A and piece B), and indicates that the two sheet-shape NOC materials are microscopically completely fused with each other. A dotted-line part in (a) of FIG. 19 indicates the fused part. Further, a part surrounded by a circle in (a) of FIG. 19 was irradiated with X-rays and subjected to SAXS and WAXS analyses. A SAXS image is shown in (b) of FIG. 19, and a WAXS image is shown in (c) of FIG. 19. Each of (b) and (c) of FIG. 19 shows a typical pattern indicating existence of NOCs, thereby indicating that fused samples are NOC materials. That is, it was confirmed that, by heating NOC materials so that the NOC materials become a DEN melt and then fusing (secondary-molding) the DEN melt and allowing this fused sample to cool, the fused sample changes back into an NOC material.

FIG. 20 shows two-dimensional scattering patterns of a sample (as one example) whose temperature was changed from room temperature to 210° C. and then back to room temperature in unrestrained state in which the sample was under no tension and free to change, which two-dimensional scattering patterns were obtained by a SAXS method. In FIG. 20, (a) shows a two-dimensional scattering pattern obtained from the sample that had not been heated yet, (b) shows a two-dimensional scattering pattern obtained from the sample that was heated, and (c) shows a two-dimensional scattering pattern obtained from the sample after cooling.

In a case where an NOC material was changed into a DEN melt and was then allowed to cool to room temperature in unrestrained state in which it was under no tension and free to change, there was observed a scattering pattern indicating that a resultant material was nano crystal (NC) whose orientation falls into disorder (is disoriented) (see a part indicated by an arrow in (c) of FIG. 20). Note that, in a case where a sample of the NOC material was changed into a mobile phase ($\alpha_2$' phase) and was then allowed to cool in a condition in which it was under no tension and free to change, the sample changed into an NOC material (data of this is omitted). This indicates that, in a case where an NOC material is changed into a DEN melt and is then allowed to cool to room temperature in unrestrained state in which it is under no tension and free to change, the NOC material becomes an NC material in some cases.

As to a sample whose temperature was changed from room temperature to 225° C., and then back to room temperature, it was found that the sample that had not been heated yet has a pattern indicating that the sample was an NOC material and a sample after cooling has a pattern indicating that FCCs exist in the sample (data is omitted). Note that a sample having 225° C. could not be subjected to the WAXS and SAXS methods because 225° C. was too high to carry out those methods. This indicates that the sample which became an equilibrium melt once does not change back into the NOC material even if the sample is allowed to cool to room temperature. That is, it was found that secondary-molding, which is an object of the present invention, could not be carried out with respect to a sample that was heated to 225° C. because, though the sample had enough flexibility to be secondary-molded, the sample became FCC after cooling.

From the above, it was found that (i) an NOC material in the form of the mobile phase ($\alpha_2$' phase) or the DEN melt can be secondary-molded by press molding etc., and (ii) by cooling the NOC material to room temperature after that, the NOC material undergoes transition to change back into the ordered phase ($\alpha_2$ phase), whereby a desired secondary-molded NOC object can be obtained.

3. Proof of Existence of DEN Melt by Thermal Measurement

An NOC material was heated to 188° C., and was elongated and formed at an elongation strain rate of 419 ($sec^{-1}$). In a case where the NOC material was cooled at a rate of temperature decrease of 10 K/min, a recrystallization temperature ($T_c$) was 125.1° C. (see a solid line in FIG. 22).

Meanwhile, in a case where an NOC material was heated to 230° C. and was elongated and formed similarly, a $T_c$ of the NOC material was 116.1° C. (see a broken line in FIG. 22).

Further, $T_c$ (125.1° C.) of a testing sample which was heated to 188° C., elongated and recrystallized was higher than $T_c$ (116.1° C.) of a testing sample which was heated to 188° C. and recrystallized without elongation (recrystallized at rest). Meanwhile, a testing sample that was heated to 230° C., elongated and recrystallized had a $T_c$ (116.1° C.) which is equal to $T_c$ of a testing sample recrystallized at rest.

From this result, it is considered that, in a case where a testing sample has 215° C. or less, the testing sample is recrystallized at a high temperature because a structure whose enthalpy relaxation time is long remains in the testing sample and crystallization is accelerated. Meanwhile, it is considered that, in a case of the testing sample whose temperature excesses 215° C., a structure whose enthalpy relaxation time is long was relaxed, and a crystallization temperature of the testing sample became the same as that of a sample that was crystallized at rest. Therefore, it can be said that this result is a proof that a DEN melt exists.

FIG. 23 shows a relationship between (i) differences ($\delta T_c$) between recrystallization temperatures ($T_c$) of testing samples formed at various elongation strain rates and $T_c$ of testing samples that were formed at rest and (ii) the elongation strain rates. Symbols of a diamond shape in FIG. 23 show results of heating an NOC material to 180° C. to 190° C., whereas symbols of a square shape in FIG. 23 show results of heating an NOC material to 190° C. to 200° C.

FIG. 23 shows that $\delta T_c$ increases as an elongation strain rate increases. Further, the results show that $\delta T_c$ becomes high as a heating temperature becomes low. Those results show that a ratio of a structure whose enthalpy relaxation time is long (DEN structure) increases as an elongation strain rate increases and as a temperature of a testing sample decreases.

INDUSTRIAL APPLICABILITY

As has been described, the present invention makes it possible to easily carry out secondary-molding of an NOC material. Accordingly, it is expected that the NOC material will be used as industrial materials far more widely. The NOC material has excellent properties such as high mechanical strength, high heat tolerance and high transparency, and particularly has a mechanical strength as high as that of metal. Therefore, the NOC material shows promise of replacing not only polymer material but also metal.

Therefore, the present invention can be used not only in various industries which handle parts made of polymers but also industries which handle parts made of metal.

REFERENCE SIGNS LIST

10 Continuously formable apparatus
1 Supercooled melt
2 Supercooled melt feeder
3 Sandwiching roller

The invention claimed is:

1. A method for secondary-molding a polymer nano oriented crystal material, comprising the steps of:
   (1) providing a polymer nano oriented crystal material by (i) elongating a polymer melt at an elongation strain rate not slower than a critical elongation strain rate, to thereby obtain an oriented polymer melt and (ii) crystallizing the oriented polymer melt;
   (2) heating the polymer nano oriented crystal material so that the polymer nano oriented crystal material changes into a melt having a dense entanglement network structure;
   (3) molding the polymer nano oriented crystal material which changed into the melt having the dense entanglement network structure in the step (2); and
   (4) cooling the polymer nano oriented crystal material, which has undergone the step (3), under a restrained condition, until the polymer nano oriented crystal material changes into an ordered phase, wherein
   the restrained condition is a condition under which the melt having a dense entanglement network structure is restricted to make no volume change,
   the polymer nano oriented crystal material comprises polymer nano oriented crystals having a crystal size d of not more than 300 nm and an orientation function $f_c$ of not less than 0.7, the orientation function $f_c$ representing a degree of orientation of polymer chains in crystals,
   the polymer nano oriented crystal material comprises a cylindrical high order structure, and
   the cylindrical high order structure comprises a bundle of strings each of which is constituted by nano oriented crystal particles connected together.

2. The method according to claim 1, wherein the polymer nano oriented crystal material is made of polyolefin.

3. The method according to claim 1, wherein the polymer nano oriented crystal material is made of polypropylene.

4. The method according to claim 1, wherein the step (3) is fusing a plurality of polymer nano oriented crystal materials together.

5. The method according to claim 1, wherein the step (3) is stacking a plurality of sheet-shape polymer nano oriented crystal materials on top of each other and fusing the plurality of sheet-shape polymer nano oriented crystal materials.

6. The method according to claim 1, wherein the step (3) is molding the polymer nano oriented crystal material by press molding, stretch molding, roll molding, drawing molding, welding molding, fusion molding or vacuum molding.

7. The method according to claim 1, wherein the polymer nano oriented crystal material has a crystallinity of more than 90%.

* * * * *